(12) United States Patent
Ano et al.

(10) Patent No.: US 8,003,038 B2
(45) Date of Patent: Aug. 23, 2011

(54) PROCESS FOR PRODUCING RESIN MOLDED ARTICLE

(75) Inventors: Tetsuya Ano, Ibaraki (JP); Atsushi Yusa, Ibaraki (JP); Satoshi Yamamoto, Ibaraki (JP); Toshiyuki Ogano, Kasukabe (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 205 days.

(21) Appl. No.: 12/509,981

(22) Filed: Jul. 27, 2009

(65) Prior Publication Data

US 2010/0025880 A1    Feb. 4, 2010

(30) Foreign Application Priority Data

Jul. 28, 2008    (JP) ................................ 2008-193557

(51) Int. Cl.
*B29C 45/00*    (2006.01)
(52) U.S. Cl. ........................ 264/328.1; 427/304; 427/306
(58) Field of Classification Search ................. 264/129, 264/328.1; 427/304, 306
See application file for complete search history.

(56) References Cited

U.S. PATENT DOCUMENTS

| | | | |
|---|---|---|---|
| 5,158,986 A | 10/1992 | Cha et al. | |
| 6,955,781 B2* | 10/2005 | Yusa et al. | 264/162 |
| 7,758,923 B2* | 7/2010 | Yusa et al. | 427/304 |
| 2003/0011090 A1* | 1/2003 | Yamaki | 264/40.3 |
| 2005/0240004 A1* | 10/2005 | Yusa et al. | 528/480 |
| 2007/0108663 A1* | 5/2007 | Yusa et al. | 264/328.1 |

FOREIGN PATENT DOCUMENTS

JP    2625576    4/1997

OTHER PUBLICATIONS

Hori, Teruo "Latest Applied Technology of Supercritical Fluid," NTS Co., Ltd., pp. 250 to 255.

* cited by examiner

*Primary Examiner* — Jill L Heitbrink
(74) *Attorney, Agent, or Firm* — Birch, Stewart, Kolasch & Birch, LLP

(57) ABSTRACT

There is disclosed a process for producing a resin molded article by using a resin into which fine metal particles are so introduced as to be hardly dissolved at the melting temperature of the resin and as to obtain high solubility in a high-pressure carbon dioxide. This process comprises the steps of forming a high-pressure fluid by dissolving, in a high-pressure carbon dioxide, a fluorine-containing metal complex and a fluorine-based solution capable of dissolving the same metal complex; introducing the high-pressure fluid into a heated and molten resin; and molding the resin having the high-pressure fluid introduced thereinto, to shape the molded article.

13 Claims, 7 Drawing Sheets

`US 8,003,038 B2`

PROCESS FOR PRODUCING RESIN MOLDED ARTICLE

TECHNICAL FIELD

The present application is filed, claiming the Paris Convention priorities of Japanese Patent Application No. 2008-193557 (filed on Jul. 28, 2008), the entire content of which is incorporated herein by reference.

The present invention relates to a process for producing a resin molded article.

BACKGROUND ART

Recently, the use of supercritical fluids such as supercritical carbon dioxide, etc. as solvents has been vigorously studied. While supercritical fluids have a surface tension of zero and thus can be as well diffused as gases, such fluids can be used as solvents because of their densities close to those of liquids. As one of the novel production processes by making effective use of the physical properties of such supercritical fluids, there is proposed nonelectrolytic plating of plastic molded articles (cf. Non-Patent Publication 1). Nonelectrolytic plating with use of a supercritical fluid makes it possible to overcome the following problems of the conventional technology of the nonelectrolytic plating of plastic molded articles.

The conventional nonelectrolytic plating is widely employed as means for forming metal films on resin molded articles for electronic equipment, etc. In general, a conventional nonelectrolytic plating process comprises the steps of molding a resin, degreasing the resin molded article, etching the molded article, neutralizing and wetting the etched molded article, adding a catalyst, activating the catalyst, and subjecting the molded article to nonelectrolytic plating, while there may be some difference in the steps, depending on materials to be used.

In the etching step, a chromic acid solution, an alkali metal hydroxide solution or the like is used.

Therefore, a post-treatment such as neutralization of an etchant is needed in the conventional nonelectrolytic plating, and such a post-treatment becomes one of factors of high cost. The use of a highly toxic etchant in the etching step induces problems in handling of the etchant. In the Europe, there was constituted the regulation of RoHS (RoHS: Restriction of the use of certain Hazardous Substances in electrical and electronic equipment). Under this regulation, the manufactures of the materials and the electric and electronic components have been obligated to guarantee that electric and electronic equipment newly put on the European market after Jul. 1, 2006 should contain no chromium (VI) or the like. It is also an urgent mission for the manufactures to change the conventional nonelectrolytic plating of plastics which heavily burdens the environment, over to an alternative nonelectrolytic plating process.

According to the process disclosed in Non-Patent Publication 1, an organic metal complex is dissolved in supercritical carbon dioxide, and a variety of polymer molded articles are brought into contact with this supercritical carbon dioxide. By doing so, the organic metal complex is infiltrated in the surfaces of the polymer molded articles. The polymer molded articles infiltrated by the organic metal complex are further treated by heating or chemical reduction, so that the organic metal complex is reduced to deposit fine metal particles. A sequence of treatments as described above modify the surfaces of the polymer molded articles so as to enable nonelectrolytic plating on the polymer molded articles. Since this process comprises no etching step, any treatment of the waste of the etchant is not needed, differently from the conventional nonelectrolytic plating. It is also not needed to roughen the surfaces of the molded articles with the etchant so as to ensure tight adhesion of the plated films to the molded articles. Therefore, the surfaces of the molded articles and the plated films are superior in smoothness to those obtained by the conventional nonelectrolytic plating with the use of an echant.

However, the nonelectrolytic plating with the use of the supercritical fluid, disclosed in Non-Patent Publication 1, has the following problem: the polymer molded article is softened at its surface by the supercritical carbon dioxide after the molding step, to thereby infiltrate the supercritcal fluid and the metal complex as a modifier in the polymer molded article. Consequently, the contour of the molded article deforms due to such softening, and thus, molding precision of the molded article can not be maintained. The nonelectrolytic plating with the use of the supercritical fluid, according to Non-Patent Publication 1, is poor in continuous productivity, because this plating is a batch process in which polymer molded articles are set in a high-pressure container so that the metal complex is infiltrated in the polymer molded articles. This plating is also unsuitable for plating of large-size molded articles, since a high-pressure container corresponding to such large size is needed.

The present inventors have proposed a method for modifying the surface of a molded article so as to enable nonelectrolytic plating on the molded article by applying this process principle to segregate fine metal particles on a plastic molded article in injection molding (Patent Publication 1), This is described in detail: for example, fine metal particles of a metal complex or the like are dissolved in a high-pressure supercritical carbon dioxide; this solution of the supercritical carbon dioxide is charged in an injection molding apparatus so as to introduce the supercritical carbon dioxide into the flow front portion of the thermoplasticizing cylinder of the injection molding apparatus; and this thermoplastic resin is injection-molded, so that the fine metal particles are segregated on the molded article simultaneously with the injection molding. Thus, the fine metal particles which act as catalytic nuclei for nonelectrolytic plating can infiltrate the molded article concurrently with the molding, and additionally, the fine metal particles can be segregated on the surface portion of the molded article. Moreover, pre-treatments for plating such as the above-described steps for infiltration and etching are not required between the molding step and the plating step.

Non-Patent Publication 1: "Latest Applied Technology of Supercritical Fluid" by Teruo Hori, issued by NTS Co., Ltd., pp. 250 to 255, 2004

Patent Publication 1: JP-B2-2625576

Problem to be Solved by the Invention

However, as a result of the present inventors' studies, it is found that, in the surface-modifying method for a molded article described in Patent Publication 1, it is needed to select such fine metal particles that can withstand the melting temperature of the resin, as the fine metal particles to be introduced into the resin. That is, once a resin to be used for a molded article is determined, the kind of usable fine metal particles is limited depending on the melting temperature of the resin.

Again, according to the surface-modifying method of Patent Publication 1, a high-pressure carbon dioxide is used to introduce the fine metal particles into the resin. It is therefore found to be needed to select such fine metal particles that can be sufficiently dissolved in the high-pressure carbon dioxide. It is also found that the maximal amount of the fine metal particles introduced into the resin is double restricted by the solubility of the fine metal particles in the supercritical carbon dioxide and the maximal amount of the supercritical carbon dioxide introduced into the resin.

In the surface-modifying method of Patent Publication 1, as the fine metal particles (i.e., the metal material as the catalytic nuclei for plating), it is desirable to select such fine metal particles that can be sufficiently dissolved in a high-pressure supercritical carbon dioxide and are hardly modified or precipitated before they are sufficiently diffused immediately after introduced into a heated and molten thermoplastic resin. In other words, desirable as the fine metal particles are those which are hardly decomposed by heat even under a high temperature atmosphere in a molding apparatus and have an extremely high solubility in a high-pressure carbon dioxide. However, fine metal particles which can concurrently satisfy these two requirements are rare.

Under such a situation, the present inventors have intensively studied in another approach without paying attentions to the fine metal particles. As a result, it is found that the use of a metal complex in a predetermined state is effective to increase the solubility of the metal complex in a high-pressure carbon dioxide, and that the metal complex itself is hard to be thermally decomposed at a temperature higher than its thermally decomposing temperature. The present invention is accomplished based on such findings.

An object of the present invention is to provide a process for producing a resin molded article, comprising the steps of introducing fine metal particles into a resin so that the fine metal particles can become hard to be thermally decomposed at a melting temperature of the resin and also can have high solubility in a high-pressure carbon dioxide; and molding this resin to shape the resin molded article.

Means for Solving the Problem

According to the first aspect of the present invention, there is provided a process for producing a resin molded article, the process comprising the steps of forming a high-pressure fluid by dissolving a fluorine-containing metal complex and a fluorine-based solution capable of dissolving the same metal complex in a high-pressure carbon dioxide; introducing the high-pressure fluid into a heated and molten resin; and molding the resin having the high-pressure fluid introduced therein to shape a molded article.

According to this first aspect, in the high-pressure fluid introduced into the heated and molten resin, the fluorine-containing metal complex and the fluorine-based solution capable of dissolving the same metal complex are dissolved in the high-pressure carbon dioxide. The fluorine-based solution is one of fluorides and has a property to be easily dissolved in a high-pressure carbon dioxide. For this reason, the dissolution of the metal complex in the high-pressure carbon dioxide is facilitated, even if the metal complex itself has no property to be easily dissolved in a high-pressure carbon dioxide.

By mixing the fluorine-based solution into the high-pressure fluid, the heat resistance of the metal complex is improved, so that the metal complex becomes hard to be decomposed by heating. This phenomenon is considered to be attributed to an event that the metal complex is coated with the fluorine-based solution.

As described above, according to the first aspect, by combining the fluorine-containing metal complex with the fluorine-based solution, the heat resistance of the fluorine-containing metal complex is improved, and the solubility of the fluorine-containing metal complex in the high-pressure carbon dioxide is increased. Therefore, it becomes possible to use a metal complex which has never been used because of its thermally decomposing temperature lower than the melting temperature of a resin (i.e., a thermoplastic resin) or a metal complex which is not sufficiently dissolved in a high-pressure carbon dioxide, for surface modification of molded articles. In other words, it becomes possible to broaden the selection range of metal complexes usable for surface modification of molded articles, and it becomes possible to include also metal complexes which have never been used alone. Thus, the surfaces of molded articles can be modified by using a metal complex selected from such a broadened range of metal complexes, in other words, by using a metal complex which is hard to be thermally decomposed even under a high temperature condition and which can obtain high solubility in a high-pressure carbon dioxide.

Further, according to the first aspect, a liquid but not a solid is used as the fluoride, and therefore, the powdery metal complex can be homogeneously mixed with the fluorine-based solution. Thus, this effect produced by the mixing with the fluorine-based solution (i.e., the fluoride) can be expected from almost all of metal complexes to be dissolved in high-pressure carbon dioxide.

Furthermore, according to the first aspect, the fluorine-based solution contained in the high-pressure fluid naturally volatilizes (or releases) from the molded article before the resin having the high-pressure fluid introduced therein has been completely molded, and thus, the fluorine-based solution is not left to remain in the molded article. For this advantage, the step of drawing the fluorine-based solution out of the molded article is not needed. Thus, formation of a plated film without any treatment for drawing the fluorine-based solution out of the molded article becomes possible. In addition, the surface precision of the molded article becomes equal to the precision of the mold. In this regard, no remaining fluorine-based solution (or fluoride) present in the molded article was confirmed by analyzing the molded article. Moreover, the volatilization of the fluorine-based solution facilitates the floating of the metal complex on the surface of the molded article, so that the metal complex can easily bleed out.

In the first aspect, the resin into which the high-pressure fluid is introduced may be optionally selected from thermoplastic resins and the like. Examples of such a resin include polyester-based synthetic fibers, thermoplastic resins such as polypropylene, polyethylene, polymethyl methlacrylate, polycarbonate, amorphous polyolefin, polyetherimide, polyethylene terephthalate, polyphenylene sulfite (PPS), ABS resin, polyamidoimide, polylactic acid, polyphthalamide and nylon resin, etc. Further, a composite material of some of them may be used. Furthermore, there may be used a resin material comprising a knead mixture of such a resin with any of inorganic fillers such as glass fibers, carbon fibers, nano-carbon and minerals (e.g., calcium carbonate).

As the high-pressure carbon dioxide, there may be used supercritical carbon dioxide, subcritical carbon dioxide, liquid carbon dioxide, gaseous carbon dioxide, etc. To improve the solubility of the fluorine-based solution in the high-pressure carbon dioxide, a small amount of an organic solvent such as ethanol may be mixed as an entrainer into the high-pressure fluid. As a medium which dissolves the fluorocompound to a certain degree, there are exemplified an air, water, butane, pentane, methanol, etc. other than the high-pressure carbon dioxide. Among those, the high-pressure carbon dioxide is most preferable because of its solubility in an organic material, comparable to n-hexane, its non-polluting property and its high affinity to plastics.

A high-pressure carbon dioxide with a pressure of from 5 to 25 MPa is used as the high-pressure carbon dioxide capable of dissolving the fluorine-containing metal complex and the fluorine-based solution. The solubility of the metal complex or the like in the high-pressure carbon dioxide tends to increase along with an increase in the pressure. When the pressure is lower than 5 MPa, the solubility of the metal complex or the like becomes extremely low, so that a surface-modifying effect (or the infiltration effect of the fluorocompound) due to the metal complex or the like can not be given to a molded plastic. When the pressure exceeds 25 MPa, the infiltration effect of the fluorocompound becomes too high, so that foaming of a molded plastic is likely to be hard to inhibit.

The metal complex is used as the catalytic nuclei for non-electrolytic plating. While the metal complex may be optionally selected, usable examples thereof include hexafluoroacetylacetonatopalladium (II), nickel (II) hexafluoroacetylacetonatohydride, copper (II) hexafluoroacetylacetonatohydrate, hexafluoroacetylacetonatoplatinum (II), hexafluoroacetylacetonato(trimethylphosphine)silver (I), dimethyl(heptafluorooctanedionate)silver (AgFOD), etc. The use of a fluorine-containing metal complex having a markedly high solubility in a high-pressure carbon dioxide, for example, hexafluoroacetylacetonatopalladium (II), is more preferable.

The fluorine-based solution is a solution of a fluorocompound, which can be used as an aid to improve the segregation of the metal complex on the surface of a molded article. Examples of the fluorocompound include perfluorotripentylamine, perfluoro-2,5,8,11,14-pentamethyl-3,6,9,12,15-pentaoxaocdadecanoyl fluoride, etc. For example, the solubility of fluorine-containing hexafluoroacetylacetonatopalladium (II) in the high-pressure carbon dioxide is very high and thus is very useful as the catalytic nuclei for plating, but this metal complex is low in thermally decomposing temperature, since the thermally decomposition-starting temperature of this metal complex in an atmospheric air or a nitrogen atmosphere is about 70° C. Once dissolved in the high-pressure carbon dioxide, the metal complex is slightly improved in heat resistance and thus is not thermally decomposed immediately after infiltrating a resin with a high temperature. However, the metal complex is thermally decomposed when the residence time in the resin becomes longer. Therefore, the metal complex is thermally decomposed before it is homogeneously dispersed in the resin. In this case, the fluorine-containing hexafluoroacetylacetonatopalladium (II) is hard to be segregated over the proximity of the surface of the molded article and may be easily buried in the molded article due to its own weight. In the meantime, the metal complex dissolved and saturated in the high-pressure carbon dioxide becomes insoluble in the high-pressure carbon dioxide due to an abrupt change in temperature or pressure, so that the metal complex is likely to abnormally precipitate before it is introduced into the resin. To suppress these disadvantageous phenomena, it is effective to mix the fluorine-based solution into the high-pressure fluid. Since the metal complex is a fluorine-containing substance, the metal complex becomes compatible with the fluorine-based solution of the same type. In addition, the fluorine-based material is also sufficiently dissolved in the high-pressure carbon dioxide, and thus acts to improve the solubility of the metal complex.

The fluorine-based solution may have a boiling point of from 150 to 400° C. The fluorine-based solution having a boiling point of lower than 150° C. immediately volatilizes upon infiltrating the resin with a high temperature, and thus is hard to be homogeneously dispersed in the resin. The present inventors' studies also have revealed that the heat resistant temperature of the metal complex, i.e., hexafluoroacetylacetonatopalladium (II), is raised, when the metal complex having a low thermally decomposing temperature is dissolved in the fluorine-based solution having a high boiling point and is compatibilized therewith. This is considered to come from the fact that the metal complex having lower heat resistance is coated with the fluorine-based solution having higher heat resistance so that the apparent heat resistant temperature of the metal complex would be raised. However, the fluorine-based solution having a boiling point higher than 400° C., if used, excessively exerts the functions which stably and thermally maintains the metal complex, and thus makes it hard for the metal complex to function as a metal catalyst due to the reduction thereof by heating, even if the metal complex is infiltrated in the resin.

The molecular weight of the fluorine-based solution may be from 500 to 15,000. The fluorine-based solution having a molecular weight of more than 15,000 becomes hard to be drawn out of the molten resin, and also becomes lower in solubility in the high-pressure carbon dioxide. In addition, such a fluorine-based solution becomes hard to bleed out to the surface portion of the molded article during the injection molding, due to its heavy molecular weight. As a result, the effect of homogeneously dispersing the fluorocompound in the surface portion of the molded article becomes lower. On the other hand, the fluorine-based solution having a molecular weight of less than 500 becomes hard to remain in the resin and thus is easily drawn out of the surface of the resin when it is introduced into the resin. The molecular weight of the fluorine-based solution is preferably within the above-specified range, also in view of the compatibility thereof with the resin.

Examples of the fluorocompound according to the first aspect, which satisfies the solubility in the high-pressure carbon dioxide, the molecular weight and the boiling point include a solution of perfluorotripentylamine of the following formula 1 (the molecular formula: $C_{15}F_{33}N$ (molecular weight: 821.1; boiling point: 220° C., manufactured by Sinquest Laboratory), and a solution of perfluoro-2,5,8,11,14-pentamethyl-3,6,9,12,15-pentaoxaoctadecanoyl fluoride of the following formula 2 (the molecular formula: $C_{18}F_{36}O_6$ (molecular weight: 996.2; boiling point: 235° C., manufactured by Sinquest Laboratory):

[Chemical formula 1]

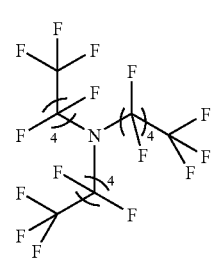

-continued

[Chemical formula 2]

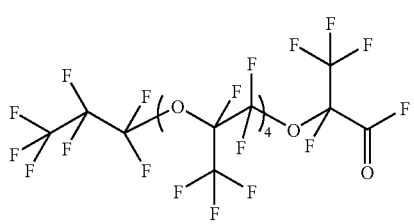

Examples of other fluorocompounds include perfluoro-2,5,8-trimethyl-3,6,9-trioxadodecanoic acid methyl ester (molecular weight: 676; boiling point: 196° C.), perfluorooctadecanoic acid (molecular weight: 915; boiling point: 235° C.), perfluoro(tetradecahydrophenanthrene) (molecular weight: 624; boiling point: 215° C.), SpectraSynQ1621 (molecular weight: 2,120; boiling point: 220° C.), 1H,1H-perfluoro-1-octadecanol (molecular weight: 900; boiling point: 211° C.), Hecakis(1H,1H,5H-octafluoro-pentoxy)phosphazene (molecular weight: 1,521; boiling point: 207° C.), 1,2-bis(dipentafluorophenyl-phosphino) ethane (molecular weight: 758; boiling point: 190° C.), perfluorododecanoic acid (molecular weight: 614; boiling point: 245° C.), perfluoro-2,5,8,11-tetramethyl-3,6,9,12-tetraoxapentadecanoyl fluoride (molecular weight: 830; boiling point: 203° C.), perfluorohexadecanoic acid (molecular weight: 814; boiling point: 211° C.), perfluoro-1,10-decanedicarboxylic acid (molecular weight; 610; boiling point: 240° C.), etc.

According to the first aspect of the present invention, the dissolution of the fluorine-containing metal complex and the fluorine-based solution in the high-pressure carbon dioxide may include the steps of dissolving the fluorine-containing metal complex in the fluorine-based solution, and dissolving the fluorine-based solution having the fluorine-containing metal complex dissolved therein, in the high-pressure carbon dioxide.

By firstly dissolving the fluorine-containing metal complex in the fluorine-based solution to form a liquid mixture as described above, the fluorine-containing metal complex can be homogeneously mixed into the fluorine-based solution. When this liquid mixture is dissolved in the high-pressure carbon dioxide later, any fluorine-containing metal complex that is not protected by the fluorine-based solution is not allowed to be present in the liquid mixture. Thus, the heat resistance of substantially all of the metal complex can be improved.

Again, according to the first aspect of the present invention, the dissolution of the fluorine-containing metal complex in the fluorine-based solution further may include the steps of forming the liquid mixture by dissolving the fluorine-containing metal complex in the fluorine-based solution, and allowing the liquid mixture to have a higher pressure.

As described above, the fluorine-containing metal complex is firstly dissolved in the fluorine-based solution, and then, the resulting liquid mixture is allowed to have a high pressure. By doing so, the treatment to dissolve the fluorine-containing metal complex in the fluorine-based solution can be carried out under a low pressure environment (i.e., under a normal pressure environment). Therefore, the fluorine-containing metal complex can be dissolved in the fluorine-based solution in a container opened to an atmospheric air. In contrast, for example, when no fluorine-based solution is used, the fluorine-containing metal complex is charged in a high-pressure container and is then mixed with a high-pressure carbon dioxide in this high-pressure container. Therefore, in order to maintain the dissolved concentration (or solubility) of the metal complex, it is needed to decompress the high-pressure container, to open or close the same container and compress the same container so as to periodically add the metal complex. This operation of charging the metal complex is one of the factors to decrease the continuous productivity. However, by dissolving the fluorine-containing metal complex in the fluorine-based solution in the above-described container opened to an atmospheric air, the continuous productivity is not decreased by the operation of charging the metal complex.

Again, according to the first aspect, the dissolution of the fluorine-containing metal complex and the fluorine-based solution in the high-pressure carbon dioxide may include the steps of dissolving and saturating the fluorine-containing metal complex and the fluorine-based solution in a first high-pressure carbon dioxide; and mixing the first high-pressure carbon dioxide having the fluorine-containing metal complex and the fluorine-based solution dissolved and saturated therein, with a second high-pressure carbon dioxide having no fluorine-containing metal complex and no fluorine-based solution dissolved therein.

By the dissolution and saturation of the metal complex and the fluorine-based solution in the first high-pressure carbon dioxide, followed by the mixing with the second high-pressure carbon dioxide, the metal complex and the fluorine-based solution can have unsaturation solubility in the high-pressure fluid obtained after the mixing. In case where the metal complex and the fluorine-based solution are dissolved with saturation solubility, the thermal decomposition or the abnormal precipitation of the metal complex is apt to occur because of an abrupt change in temperature or pressure, caused when the metal complex is introduced, for example, into the heating cylinder in the course of supplying the metal complex to the molding apparatus. However, such a problem is not caused in the present invention.

In addition, the mixing ratio of the second high-pressure carbon dioxide to the first high-pressure carbon dioxide is adjusted to thereby reliably control the solubility of the metal complex or the like in the high-pressure fluid obtained after the mixing, to a desired unsaturation solubility. Since the solubility of the metal complex or the like can be stabilized at a desired unsaturation solubility, the amount of the metal complex to be introduced into the resin can be readily and optimally controlled by controlling the supply time of this high-pressure fluid or the like.

In contrast, in case where only an expensive material such as the metal complex is dissolved in a high-pressure carbon dioxide, the metal complex is dissolved in the high-pressure carbon dioxide with saturation solubility, so as to stabilize the amount of the metal complex dissolved in the high-pressure carbon dioxide (or to stabilize the amount of the metal complex introduced into the resin). In this case, the thermal decomposition or abnormal precipitation of the metal complex is apt to occur because of the dissolution and saturation of the metal complex, which results in higher cost.

That is, in case where the metal complex is dissolved in the high-pressure carbon dioxide with the saturation solubility, it is needed to control the amount of the metal complex supplied to the resin by the amount of carbon dioxide supplied to the resin. However, it is not sufficient to simply supply the high-pressure carbon dioxide to the resin, but it is needed to supply the high-pressure carbon dioxide in an optimal amount in accordance with the volume of a molded article and molding conditions. This is because too small an amount of the high-pressure carbon dioxide supplied to the resin makes it difficult to sufficiently diffuse the metal complex in the resin. On the other hand, too large an amount of the high-pressure carbon dioxide supplied to the resin becomes impossible to infiltrate the resin, so that the metal complex is apt to separate. When the metal complex or the like can not completely infiltrate the resin, the resultant molded article tends to deform, or foaming tends to occur in the molded article. Since the amount of the high-pressure carbon dioxide supplied to the resin is needed to be optimized, the amount of the metal complex supplied to the resin is determined depending on the amount of the high-pressure carbon dioxide supplied to the resin, even when the amount of the metal complex supplied to the resin is controlled by the amount of the high-pressure carbon dioxide supplied to the resin. As a result, the metal complex dissolved in the high-pressure carbon dioxide with the saturation solubility is, in principle, excessively supplied to the resin. In contrast, according to the first aspect of the present invention, the amount of the high-pressure carbon dioxide supplied to the resin and the amount of the metal complex supplied to the resin can be independently and separately controlled, so that these two supply amounts can be optimized. Consequently, the thermal decomposition or the abnormal precipitation of the metal complex can be prevented, while an optimal amount of the high-pressure carbon dioxide being supplied to the resin, and further, the excessive supply of the metal complex is prevented to thereby suppress cost-up.

In the first aspect of the present invention, the resin-molding method may be optionally selected: injection molding, extrusion molding or compression molding is preferable. In case of injection molding, the high-pressure fluid may be introduced into the plasticized molten resin in the flow front portion as the leading end of the heating cylinder, during a suck-back operation after a weighing operation (the flow front method); or a clearance is formed between the filled resin and the mold by moving the mold charged with the injected resin, and the high-pressure fluid is introduced into this clearance (the core back method); or the plasticized molten resin and the high-pressure fluid in one of two heating cylinders are entirely kneaded, and this knead mixture is divided into the two heating cylinders for sandwich molding or two-color molding, to thereby modify only the surface skin or a part of the resultant molded article by the use of the high-pressure carbon dioxide, and such a modified material is used for molding (the screw kneading method).

Again, according to the first aspect of the present invention, there is provided a process for producing a resin molded article, using an injection-molding apparatus which comprises a mold and a heating cylinder which heats and melts a resin and injects the molten resin into the mold, wherein the introduction of a high-pressure fluid into the heated and molten resin may include the step of introducing the high-pressure fluid into the resin heated and molten in the heating cylinder; and the molding of the resin having the high-pressure fluid introduced thereinto may include the step of injecting the resin having the high-pressure fluid introduced thereinto, from the heating cylinder into the mold. In this case, the resin which has the high-pressure fluid introduced thereinto and is then kneaded may be the resin in a whole of the heating cylinder or the resin only in the flow front portion in the front of the screw.

By introducing the high-pressure fluid into the heating cylinder of the injection molding apparatus, the metal complex or the like can be directly introduced into the molten resin. Therefore, a desired surface-modifying effect can be produced for a molded article, using the necessary and smallest amount of the metal complex, in comparison with the case where a molded article is placed together with the metal complex in a high-pressure container so that the metal complex is infiltrated in the molded article. Thus, the amount of the metal complex to be used for every one operation can be reduced without impairing the surface-modifying effect by the metal complex. The high-pressure fluid contains the fluorine-based solution, and thus, the heat resistance of the metal complex is improved, so that the metal complex is not thermally decomposed or precipitated at the introduction inlet of the cylinder heated to a high temperature so as to melt the resin, immediately after the introduction of the metal complex. Therefore, the metal complex can be almost homogeneously mixed into the molten resin in the heating cylinder.

In this process for producing the resin molded article with the use of the injection molding apparatus, the high-pressure carbon oxide having the fluorine-based solution (or the fluorocompound) dissolved therein is introduced, for example, into the flow front portion of the molten resin in the heating cylinder. After that, the molten resin in the same cylinder is injected into the mold, and then, firstly, the flow front portion of the molten resin, having the fluorine-based solution infiltrated therein, is injected into the mold, and then, the molten resin in which the fluorine-based solution is not infiltrated is injected into the mold.

When the flow front portion of the molten resin, having the fluorine-based solution infiltrated therein, is injected into the mold, the same molten resin is pulled to the inner surface of the mold to be in contact therewith due to a fountain flow phenomenon (a fountain effect) of the flowing resin within the mold, and the molten resin is diffused within the mold while being in contact with the inner surface of the mold as above. When the molten resin having no fluorine-based solution infiltrated therein is then injected into the mold, the molten resin spreads entering the inner portion of the flow front portion of the molten resin which already has been injected into the mold, to thereby push and spread the mass of the flow front portion of the molten resin from the inner side. Why this fountain flow phenomenon occurs is, for example, that the resin is hard to flow due to contact resistance between the resin and the inner surface of the mold at a portion where the resin contacts, while the center and inner portion of the resin is considered to be easy to flow.

Thus, the surface portion (i.e., the surface layer or the skin layer) of the molded article is formed of the flow front portion of the molten resin. That is, in this process for producing the resin molded article, there can be obtained the molded article which comprises the skin layer having the fluorine-based solution (or the fluorocompound) dispersed therein, and the core layer having substantially no fluorine-based solution (or the fluorocompound) dispersed therein. That is, the metal complex can be effectively segregated over the surface portion (or the skin layer) of the molded article, while unnecessary distribution of the metal complex in the inner portion (or the core layer) of the molded article is being prevented.

The fluorine-based solution (or the fluorocompound) in the skin layer is lower in surface energy because of the content of fluorine and has a lower molecular weight, and thus moves to float to the surface of the skin layer (or bleeds out). The fluorine-containing metal complex or a modified product thereof also tends to be maldistributed on the surface portion of the skin layer. In particular, it is considered that the metal complex, compatibilized with the fluorine-based solution, is more likely to bleed out, as compared with the metal complex alone. As a result, the fluorine-based solution (or the fluorocompound) and the metal complex or the modified product thereof are maldistributed on the surface portion of the skin layer, before the molding of the resin within the mold has been completed.

For this advantage, in the process for producing the resin molded article with the use of the injection molding apparatus, the fluorine-based solution (or the fluorocompound) having a certain solubility in the high-pressure carbon dioxide, the metal complex dissolved together with this solution, etc. can be infiltrated at a high concentration in the surface portion of any of a variety of molded articles. This resin molded article-producing process with the use of the injection molding apparatus can be applied to the surface-modifying techniques for a variety of molded articles. That is, the surface-modifying step for the molded article can be carried out concurrently with the molding step. Further, the fluorine contained in the fluorine-based solution bleeds out to the surface of the molded article to thereby effectively function as a mold releasing agent, so that the releasability of the mold is also improved.

Again, according to the first aspect of the present invention, the process may include a step for conducting a heat treatment or a vacuuming treatment on the molded article shaped of the resin having the high-pressure fluid introduced therein.

By the heat treatment or the vacuuming treatment of the molded article, the metal complex or the modified product thereof residual in the molded article is bled out to the surface of the molded article (as if being pushed up to move to the surface of the molded article). As a result, the concentration of the metal complex or the modified product thereof in the surface portion with a depth of several microns from the surface of the molded article can be further increased. As a result, a sufficient amount of the metal complex or the like can be reliably ensured in the surface portion with a depth of several microns from the surface of a whole of the molded article, and an uniform and high strength can be obtained as the adhesion strength of a plated film which is grown using the metal complex as catalytic nuclei. Further, the amount of expensive materials such as the metal complex to be used can be reduced by suppressing the addition amount of the metal complex to the minimum. In case where the metal complex is used as the catalytic nuclei for plating, the amount of the metal complex to be used for one operation of molding can be decreased without any decrease of the amount of the metal complex to be effectively used for plating.

It becomes possible to collect the metal complex or the like in the proximity of the surface of the resin molded article by the above-described injection molding wherein the high-pressure fluid is introduced into the flow front portion of the molten resin. However, it is difficult to control the concentration distribution of the metal complex or the like in the depth direction in the order of submicron. In addition, the concentration distribution of the metal complex is apt to change, depending on subtle differences in molding conditions and the shapes of molded articles, even when the molded articles are shaped using the same apparatus. To overcome this problem, the present inventors have studied and considered that it is the most effective to infiltrate the metal complex in the surface of the molded article to a depth in the order of submicron from the surface thereof, so as to cause the metal complex or the like to function as catalytic nuclei for plating. Then, a heat treatment or a vacuuming treatment is conducted on the resultant molded article, so that the concentration of the metal complex or the like in the surface portion with a depth in the order of submicron from the uppermost surface of the molded article can be stabilized at a high level to thereby suppress a variation of the concentration. As a result, the variation in the adhesion of the plated film can be suppressed.

As described above, the fluorine-based solution introduced together with the metal complex into the heating cylinder already has been drawn out from the molded article before the completion of the molding. Therefore, the fluorine-based solution or the metal complex does not bleed out from the molded article, even when a heat treatment or a vacuuming treatment is made on the molded article. Thus, formation of holes (numerous pores in the order of nanometer) due to such bleeding can be prevented. Therefore, the surface roughness of the molded article is not accelerated, even when a heat treatment or a vacuuming treatment is made on the molded article. That is, the concentration of the metal complex or the like in the surface portion of the molded article can be increased without impairing the smoothness of the molded article.

Again, according to the first aspect of the present invention, the process further may include a step of forming a metal film on the molded article.

The metal complex or the modified product thereof is infiltrated in the surface portion of the molded article shaped by the process according to the first aspect. Therefore, a plated film can be formed by using this metal complex or the modified product thereof as catalytic nuclei for the growth of the plated film. As a result, the plating treatment can be made on the molded article without any pre-treatment, and thus, the plated film with a high adhesion strength can be formed.

In particular, by conducting the bleed-out treatment on the resultant molded article, the density of the metal complex or the like in the surface portion of the molded article can be increased. In addition, the surface of the primer layer of the molded article is not roughened as in the conventional non-electrolytic plating process including an etching step, and thus, a plated film with a high surface smoothness can be formed with an adhesion strength equal or superior to that of a plated film formed by the conventional nonelectrolytic plating process.

The formation of the metal film on the molded article may include a step of bringing the molded article into further contact with a fluid in which other high-pressure carbon dioxide and a plating solution are compatible with each other. In this regard, a stirring means such as a magnetic stirrer may be used to compatibilize the high-pressure carbon dioxide with the plating solution.

By compatibilizing the high-pressure carbon dioxide with the plating solution, it becomes possible for the plating solution to deeply infiltrate the molded article with a higher infiltration force, together with the high-pressure carbon dioxide. Consequently, the plated film deeply grows to have an adhesion strength equal or superior to that of a plated film formed by the conventional nonelectrolytic plating process including an etching step, while the molded article is maintaining a smooth surface.

Effect of the Invention

As described above, according to the process for producing a resin molded article of the present invention, fine metal particles so treated as to be hard to be thermally decomposed at a melting temperature of a resin and as to have high solubility in a high-pressure carbon dioxide are introduced into the resin, and such a resin is molded to modify the surface of a molded article.

Best Modes for Carrying Out the Invention

Hereinafter, examples of the process for producing a resin molded article, according to the present invention, will be described with reference to the accompanying drawings. However, the following examples are preferred examples of the process of the present invention, and thus, the scope of the present invention is not limited to the details thereof in any way.

BRIEF DESCRIPTION OF DRAWINGS

FIG. 4, consisting of FIGS. 4(a) and 4(b), schematically shows the states of the molten resin charged in the mold by injecting, wherein

Figure 1:
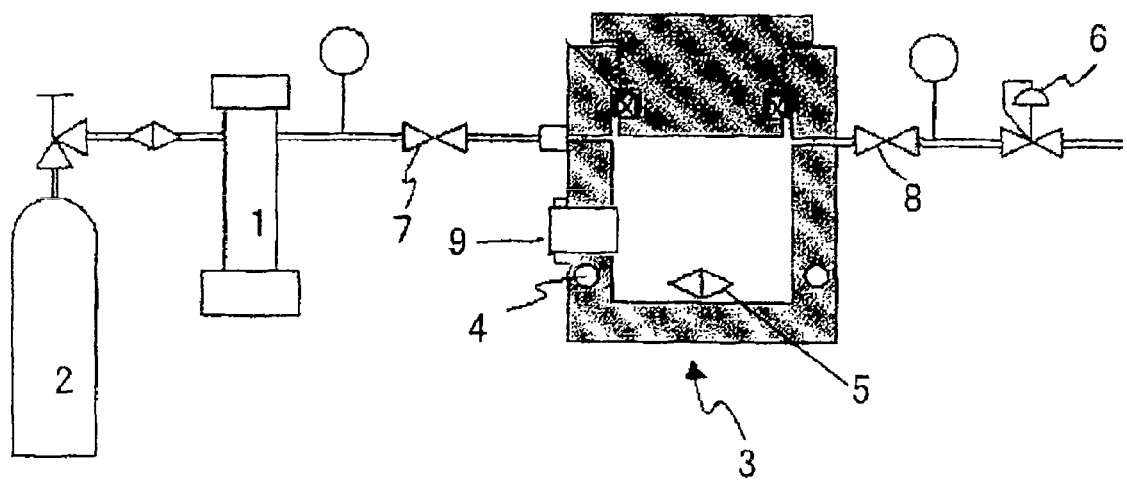
FIG. 1 shows the schematic diagram of the heat resistant temperature-measuring apparatus used in the preliminary comparative test.

DESCRIPTION OF REFERENCE NUMERALS 1 or 1'=a syringe pump
12 or 12'=a dissolution tank
25=a material-stocking container
101=a mold
105=a plasticizing cylinder (or a heating cylinder)
1130=a molded sample (or a molded body)

PRELIMINARY TEST EXAMPLES

Prior to the description of Examples, the preliminary test examples conducted by the present inventors are described. The preliminary test examples were made to compare the heat resistant temperatures of metal complexes, affected by the presence or absence of a fluorine-based solution. This is described in detail: the heat resistant temperature of a metal complex was measured when hexafluoroacetylacetonatopalladium (II) as the metal complex and perfluorotripentylamine as a fluorine-based solution were dissolved in a high-pressure carbon dioxide (hereinafter, this fluid being referred to as a first fluid); and the heat resistant temperature of the same metal complex was measured when the metal complex alone was dissolved in a high-pressure carbon dioxide (hereinafter, this fluid being referred to as a second fluid).

The heat resistant temperature-measuring apparatus used in this comparative test is shown in FIG. 1. The heat resistant temperature-measuring apparatus comprises a liquid carbon dioxide bomb 2, a syringe pump 1, a high-pressure container 3 and a back pressure valve 6 as main members. The high-pressure container 3 includes heaters 4, a sight window 9 and a stirrer 5.

The inner volume of the high-pressure container 3 was 25 ml. In the test for the first fluid, the metal complex (500 mg) and the fluorine-based solution (10 g) were charged in this high-pressure container 3. In the test for the second fluid, the same metal complex (500 mg) alone was charged in this high-pressure container.

A high-pressure carbon dioxide was supplied to the high-pressure container 3 from the liquid carbon dioxide bomb 2 through the syringe pump 1. The inner pressure of the high-pressure container 3 during the test was maintained by the back pressure valve 6. The inlet valve 7 of the high-pressure container 3 was closed, and then, the syringe pump 1 was used to supply the high-pressure carbon dioxide with a pressure of 10 MPa at a normal temperature to the high-pressure container 3. The temperature of the high-pressure container 3 was raised by every 5° C. per one minute using the heater 4. The set pressure for the back pressure valve 6 was 10 MPa. Therefore, the interior of the high-pressure container 3 was always maintained at 10 MPs independently of a change in the temperature.

Figure 2:
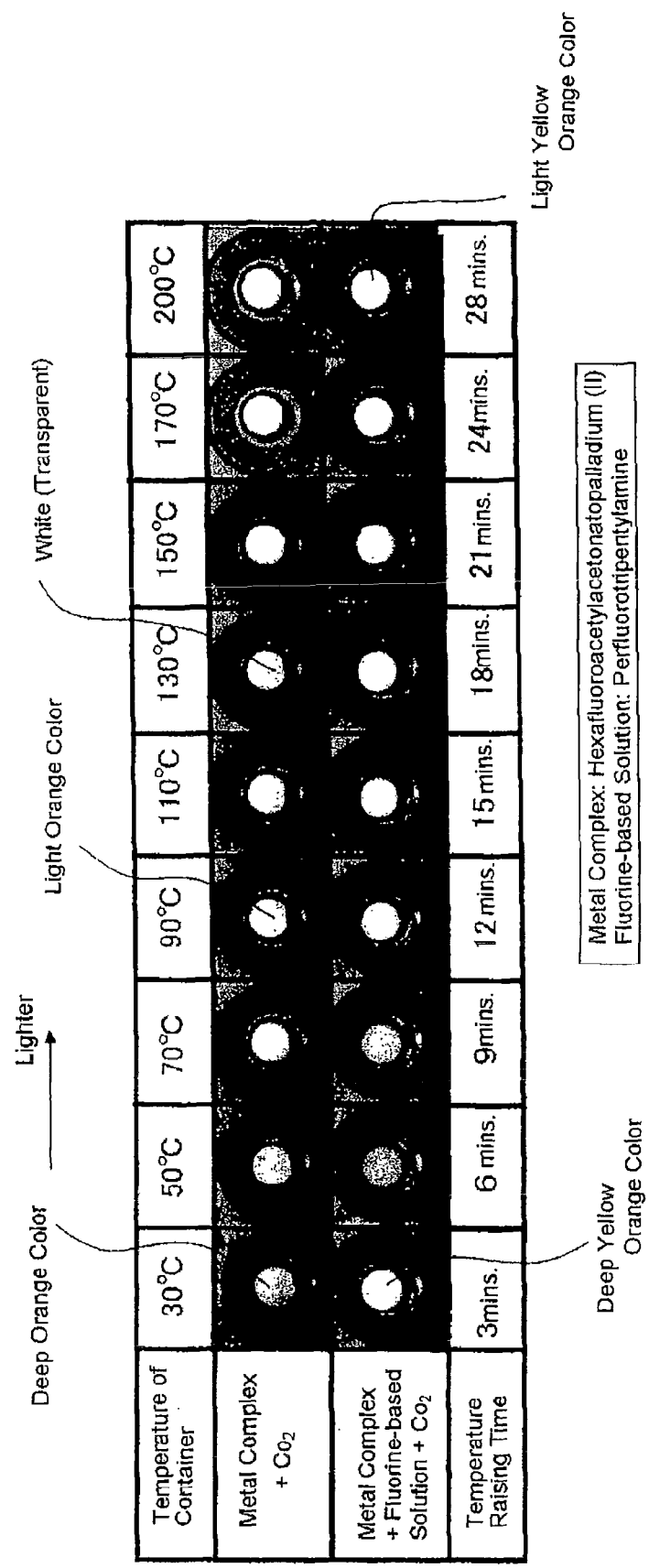
FIG. 2 shows the table illustrating changes in the colors of the fluids in the high-pressure containers shown in FIG. 1.

FIG. 2 shows a table which indicates the changes of the colors of the first fluid and the second fluid in the high-pressure containers with the passage of time. The lower line of the table shown in FIG. 2 is for the first fluid; and the upper line thereof, for the second fluid. When the temperatures of the containers were 30° C., respectively, both of the first fluid and the second fluid were colored orange with the same optical density. This orange color was attributed to hexafluoroacetylacetonato-palladium (II).

Even when the temperatures of the containers were raised from 30° C., the colors of the first fluid and the second fluid were not changed for a while and were maintained to be the same colors with the same optical densities as those at 30° C.

When the second fluid indicated in the upper line was heated to a temperature higher than the heat resistant temperature (150° C.) of hexafluoroacetylacetonatopalladium (II), the orange color disappeared from the fluid. This was because the orange-colored metal complex was decomposed by heat so that the color of the fluid was changed from the orange color of the metal complex to the transparent color of the high-pressure carbon dioxide.

In contrast, the orange color of the first fluid in the lower line was sustained, even when the fluid was heated to a temperature higher than the heat resistant temperature (150° C.) of hexafluoroacetylacetonatopalladium (II). The orange color of the first fluid was sustained even at 200° C., and the first fluid in the container did not turn transparent. This fact indicates that the metal complex was not decomposed even when heated to a temperature higher than the melting temperature. Herein, perfluorotri-pentylamine was kept to be transparent within the above-described temperature ranges.

From these test results for comparison, it is known that the heat resistant temperature of the metal complex becomes higher by dissolving the metal complex, i.e., hexafluoro-acetylacetonatopalladium (II), in the high-pressure carbon dioxide, together with perfluoro-tripentylamine. This is considered as follows: hexafluoroacetylacetonatopalladium (II) contains a fluorine atom, and perfluorotripentylamine has a property to be easily compatible with a fluorine-containing metal complex, so that, consequently, the fluorine-based solution encloses the fluorine-containing metal complex in the high-pressure container to protect the metal complex.

The melting temperature of a thermoplastic resin during injection-molding or other molding thereof is generally 150° C. or higher. When the fluorine-containing metal complex having a thermally decomposing temperature lower than the molding temperature is dissolved in the fluorine-based solution, the metal complex as it is can be supplied to the molten resin, accordingly. In the meantime, the time while the metal complex is exposed to a high temperature atmosphere during practical injection-molding is several tens seconds. Accordingly, the apparent heat resistant temperature of the metal complex dissolved in the fluorine-based solution during the practical injection-molding is supposed to be far higher than the heat resistant temperature measured in the above-described test.

Example 1

In this Example, a high-pressure fluid which contained a fluorine-containing metal complex, a fluorine-based solution and a high-pressure carbon dioxide was infiltrated and dispersed in a thermoplastic resin heated and molten in the heating cylinder of an injection-molding apparatus; and the heated molten resin obtained after the infiltration-and-dispersion treatment was molded to shape a surface-modified molded article. The resultant molded article was subjected to a heat treatment to bleed out the metal complex, and then, a metal film was formed on the resulting molded article by nonelectrolytic plating.

As the thermoplastic resin, there was used polyamide6 (Nylon6, Novamid GH10 manufactured by Mitsubishi Engineering-Plastics Corporation) containing 10% of glass fibers. As the fluorine-containing metal complex, there was used hexafluoroacetylacetonatopalladium (II) of which the thermally decomposing temperature was 150° C. As the fluorine-based solution which dissolved the metal complex, there was used perfluorotripentylamine (the molecular formula: $C_{15}F_{33}N$ (manufactured by Sinquest Laboratory; molecular weight: 821.1; and boiling point: 220° C.). As the high-pressure carbon dioxide, there was used a liquid carbon dioxide with a temperature of 10° C. and a pressure of 10 MPa.

Molding Apparatus

Figure 3:
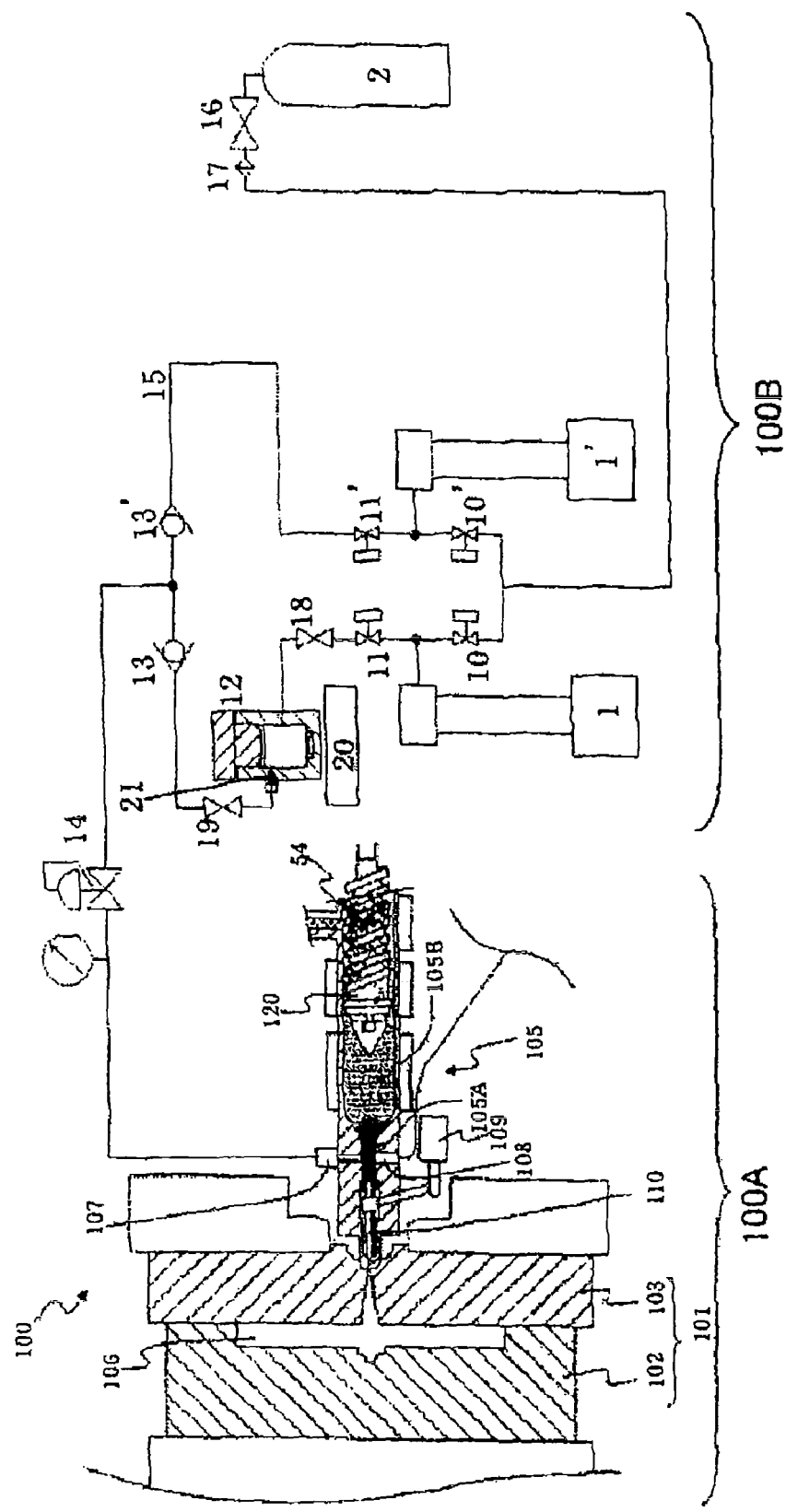
FIG. 3 shows the schematic diagram of the flow front injection-molding apparatus used in Example 1, illustrating the structure thereof.

FIG. 3 shows the schematic diagram of a flow front injection-molding apparatus used in this Example. This molding apparatus 100 comprises an injection-molding section 100A and a high-pressure carbon dioxide-generating section 100B. The injection-molding section 100A includes a mold 101 which comprises a movable mold 102 and a stationary mold 103. A disc-shaped cavity 106 having a spool at its center is formed when the movable mold 102 strikes the stationary mold 103. In this Example, the surfaces of the movable mold 102 and the stationary mold 103 which defined the cavity 106 are shaped as plane surfaces (mirror surfaces) except for the portions corresponding to the center portion of the cavity 106 (e.g., the spool, etc.).

The injection-molding section 100A includes a plasticizing cylinder 105 which heats and melts a thermoplastic resin supplied from a hopper (not shown) and injects the molten resin into the cavity 106 of the mold 101. Further, a gas-introducing mechanism 107 is provided at the flow front portion 105A of the heating cylinder 105 (or the plasticizing cylinder), and the high-pressure carbon dioxide-generating section 100B is connected to this gas-introducing mechanism 107. Other structure of the injection-molding section 100A is similar to that of a conventional injection-molding apparatus.

The high-pressure carbon dioxide-generating section 10B comprises, as shown in FIG. 3, a carbon dioxide bomb 2, two known syringe pumps (E-260, manufactured by ISCO) 1 and 1', a dissolution tank 12, four air operation valves 10, 10', 11 and 11' which interlock with the injection-molding section 100A to automatically open or close, and two check valves 13 and 13'.

The dissolution tank 12 was charged with a mixture solution of hexafluoroacetylacetonatopalladium (II) as the metal complex and perfluorotripentylamine as the fluorine-based solution (or a fluorocompound). Specifically, the mixture solution of perfluorotripentylamine in which hexafluoro-acetylacetonatopalladium (II) was completely dissolved was dispersed on a wet support, and this wet support (manufactured by ISCO) as a liquid carrier was so charged in the dissolution tank 12 as not to flow out when the high-pressure carbon dioxide was supplied. These materials were charged in sufficient amounts so as to always oversaturate. Therefore, the mixture solution of the metal complex and the fluorocompound was always saturation-dissolved in the high-pressure carbon dioxide in the dissolution tank 12. The operation of charging these materials was carried out, for example, by closing two manual valves 18 and 19, and releasing a pressure from the dissolution tank 12 with a manual valve (not shown) to void the dissolution tank 12 for charging the wet support.

The high-pressure carbon dioxide in the carbon dioxide bomb 2 was firstly supplied to the syringe pumps 1 and 11 through a manual valve 16, a filter 17 and the air operation valves 10 and 10' on the suction side, respectively. In this operation, the manual valve 16 and the air operation valves 10 and 10' on the suction side were opened, and the air operation valves 11 and 11' on the supply side were closed. Pistons (not shown) in the respective syringe pumps 1 and 1' were caused to move backward so that the liquid carbon dioxide cooled to 10° C. was sucked into the respective syringe pumps 1 and 1'. The peripheries of the heads of the syringes 1 and 1' were cooled by chillers to cool the carbon dioxide to 10° C., so that the carbon dioxide in a liquid state was sucked into the syringe pumps 1 and 1'. The high-pressure carbon dioxide having a low temperature to be in a liquid state, rather than that having a high temperature to be in a gaseous state, was stabilized in density and thus could be precisely measured. The supply of the high-pressure carbon dioxide to the respective syringe pumps 1 and 1' was done for every molding shot.

The syringe pumps 1 and 1' measured after having the high-pressure carbon dioxide sucked thereinto received a trigger signal which was generated while the injection-molding section 100A was plasticizing and measuring the resin. When a certain time predetermined by a delay timer had passed since the output of this trigger signal, the two syringe pumps 1 and 1' drived their pistons for a given time according to constant flow rate controls independently of each other.

By doing so, the high-pressure carbon dioxide fed from the syringe pump 1 dissolved the materials charged in an oversaturation state in the dissolution tank 12. The materials were dissolved at a saturation solubility in the high-pressure carbon dioxide. Then, the syringe pump 1 was driven to cause the high-pressure carbon dioxide and the materials dissolved therein in a saturated state to pass through the filter 22 and then supply them to the injection-molding section 10A.

Then, the high-pressure carbon dioxide having these materials dissolved and saturated therein and a high-pressure carbon dioxide fed from the syringe pump 1' were allowed to pass through the check valves 13 and 13', and then were mixed with each other. Thus, a high-pressure fluid was formed. Since the high-pressure carbon dioxide fed from the syringe pump 1' contained no material, the materials were diluted with this high-pressure fluid and thus were dissolved at non-saturation solubility in the high-pressure carbon dioxide. The high-pressure fluid was supplied to the molten resin in the plasticizing cylinder 105, through the gas-introducing mechanism 107. During the supply of the high-pressure fluid, the air operation valves 10 and 10' on the suction side were closed, while the air operation valves 11 and 11' on the supply side were opened.

By diluting the materials dissolved in the high-pressure carbon dioxide, the following two problems can be solved. The first problem is that, when the materials are dissolved at saturation solubility in the high-pressure carbon dioxide, the pressure of the carbon dioxide lowers or the temperature thereof changes during the supply thereof; the saturation solubility of the material tends to decrease due to the influence of such a change, so that the material oversaturates to precipitate. For example, when a loss in pressure occurs during the supply of the material to the plasticizing cylinder 105, the material precipitates at such a supply site. As a result, the precipitated material clogs the pipe, and the supply of the material having stable solubility becomes difficult. However, the precipitation of the material during the supply thereof can be prevented by supplying the material dissolved in a non-saturation state.

The second problem is that, when an expensive material such as a metal complex dissolved in a saturated state in a high-pressure carbon dioxide is supplied, the supply amount of the metal complex or the like is needed to be controlled by the supply amount of carbon dioxide to a resin, with the result that the metal complex or the like in an amount exceeding the amount required for the surface modification of a molded article is supplied to the molten resin, which leads to a higher cost. In other words, an optimal supply amount of the high-pressure carbon dioxide to the resin is determined substantially depending on the volume of a desired molded article and molding conditions. Too small a supply amount of the high-pressure carbon dioxide leads to insufficient dispersion of the material in the resin. On the other hand, too large a supply amount of the high-pressure carbon dioxide makes it hard to infiltrate the material in the resin, so that the material is apt to separate, with the result that the resultant molded article tends to deform or foam. However, both of the supply amounts of the high-pressure carbon dioxide and the material can be controlled independently of each other to be optimized, by diluting the material with a high-pressure carbon dioxide containing no material.

In this Example, the high-pressure carbon dioxides from two systems on the sides of the syringe pumps 1 and 1' may be merged and mixed to form a high-pressure fluid, which may be mechanically stirred with a magnetic stirrer 20 or the like or may be stirred by using a pipe having a stirring function. The pressure of the high-pressure fluid to be supplied to the resin (i.e., the pressure of the high-pressure fluid which is being controlled in flow amount) is controlled to be constant by the back pressure valve 14.

In the present invention, the temperature and pressure of the high-pressure carbon dioxide may be optionally selected. In this Example, the pressure thereof was set at 10 MPa, and the temperature thereof, at a room temperature. While the pressures of the high-pressure carbon dioxides in the interval from the pumps 1 and 1' to the high-pressure carbon dioxide-introducing mechanism 107 (including the dissolution tank 12 and the back pressure valve 14) were constantly maintained at 10 MPa, the syringe pumps 1 and 1' were ready to receive a trigger signal from the injection-molding section 100A. Thus, the high-pressure carbon dioxide-generating section 100B could supply predetermined amounts of the high-pressure carbon dioxide and the material, at every time when receiving the trigger signal which was generated while the injection-molding section 100A was plasticizing and measuring the resin.

Injection-Molding Method

Figure 4A:
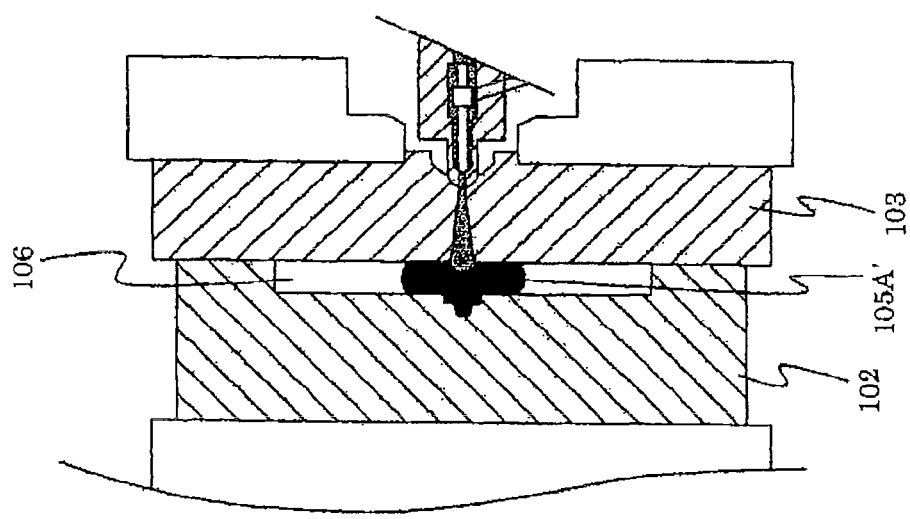
FIG. 4(a) shows a state in which the charging of the molten resin is started.
Figure 4B:
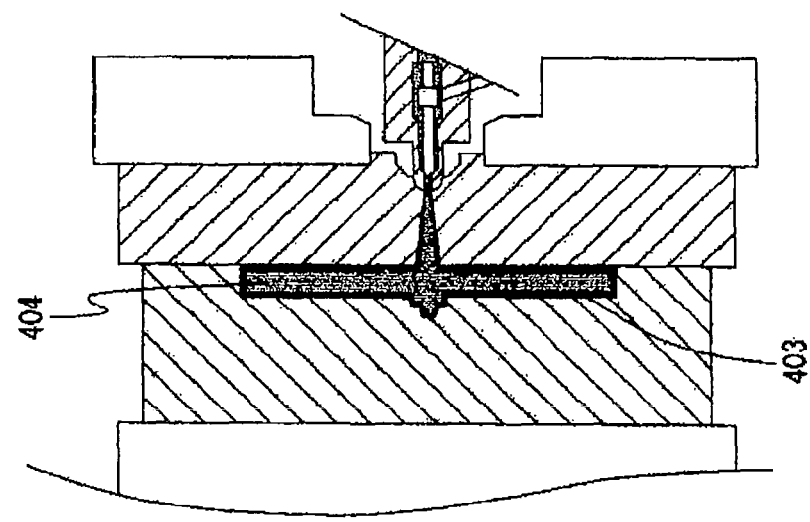
FIG. 4(b) shows a state in which the charging of the molten resin is completed.

With reference to FIGS. 3 and 4, the molding method employed in this Example will be described. Firstly, the screw 120 in the heating cylinder 105 was rotated. The pellets 54 of the resin supplied to the heating cylinder 105 were molten and plasticized, and the resulting molten resin is extruded to the portion 105B in the front of the screw 120. The screw 120 was moved backward by the extrusion of the molten resin, and was stopped at a predetermined backward position. Thus, the amount of the molten resin corresponding to the backward movement of the screw 120 was measured.

Then, the injection-molding section 100A generated a trigger signal, and simultaneously, the screw 120 was moved backward. By this operation, the molten resin measured was decompressed. In this Example, through an inner pressure monitor 108 for the molten resin, provided around the flow front portion 105A of the heating cylinder 105, it was confirmed that the inner pressure of the resin was reduced to 4 MPa or lower.

Next, the high-pressure fluid was introduced into the molten resin in the flow front portion 105A of the heating cylinder 105, through the gas-introducing mechanism 107. By this operation, the supercritical carbon dioxide having the fluorocompound and the metal complex dissolved therein was introduced into the molten resin.

In this Example, the ratio of the flow amount of the syringe pump 1 in which the metal complex and the fluorine-based solution were dissolved, to the flow amount of the syringe pump 1' in which no material was not dissolved was set at 1:9. Since the diluted metal complex or the like was introduced into the resin, the metal complex or the like could be continuously and stably introduced into the molten resin without precipitating. The weight of the surface skin portion of the molded article obtained in this Example was about 20 g. Thus, the amount of the regulated high-pressure carbon dioxide infiltrated was about 0.6 g which was 3% by weight of the molded article. The specific gravity of the high-pressure carbon dioxide under the pressure and temperature conditions of this Example was about 0.8 g/cm$^3$. The feeding amount of the high-pressure fluid per one shot was set at 0.5 ml. In this case, 0.05 ml of the carbon dioxide having the metal complex and the fluorine-based solution dissolved therein was supplied, and 0.45 ml of carbon dioxide alone was supplied.

In the meantime, the present inventors measured the solubility of the materials in a high-pressure carbon dioxide of 15 MPa at a room temperature by the extraction method or the visual observation. As a result, the solubility of the metal complex was 30 g/L (equivalent to 0.3 g in a 10 ml dissolution tank 12), and the solubility of the fluorine-based solution was 200 g/L (equivalent to 2 g in the 10 ml dissolution tank 12). On the other hand, the metal complex was dissolved in the fluorine-based solution, and it was found that 8 g of the fluorine-based solution was needed to completely dissolve 0.5 g of the metal complex. Therefore, 0.5 g of the metal complex was dissolved in 8 g of the fluorine-based solution, and the resulting solution was charged in the dissolution tank 12.

When the introduction of the high-pressure fluid was completed, the screw 120 was moved forward by a back pressure and thus is returned to a packing-starting position. By this operation, the carbon dioxide, the fluorocompound and the metal complex introduced into the flow front portion 105A in the front of the screw 120 were homogeneously diffused in the molten resin.

When the above-described measuring operation was completed, the air piston 109 was driven to open the shut-off valve 110, and the molten resin was injected into the cavity 45 of the mold 42 defined by the movable mold 43 and the stationary mold 44, from the heating cylinder 105, to pack the cavity 45 with the molten resin.

FIG. 4 shows the schematic diagrams illustrating the molten resin-packing conditions within the mold 101 during the injection-packing operation. FIG. 4(*a*) shows the schematic diagram illustrating the molten resin packed at the beginning. In this beginning stage, the molten resin 105A' was packed in the flow front portion 105A, and the fluorocompound and the carbon dioxide infiltrated in this molten resin were diffused in the cavity 106 while being decompressed. In this stage, the molten resin 105A' in the flow front portion 105A was allowed to flow and spread contacting the surface of the mold, because of the fountain effect produced by the packing of the molten resin, so that the skin layer 403 of the molded article was formed.

The molten resin was further injected to fill a whole of the cavity 106. When the filling by injection was completed, the skin layer 403 impregnated with the fluorocompound was formed on the surfaces of the plastic molded article (or the molded body), and a core layer 404 having substantially no material infiltrated therein was formed inside the molded article. In this way, the amount of the fluorocompound to be used could be decreased by decreasing the amount of the inner fluorocompound which did not contribute to a surface function, inside the molded article.

In this regard, by increasing the dwell pressure of the molten resin after the primary packing, foaming of the molded article because of gasification of the carbon dioxide could be suppressed. In the molding method of this Example, the supercritical carbon dioxide, etc. were infiltrated in the resin only at the flow front portion 105A of the plasticizing cylinder 105, and thus, the amount of carbon dioxide to the entire amount of the packed resin was small, accordingly. Therefore, the surface condition of the molded article was hard to degrade, even if a counter pressure was not applied to the interior of the cavity 106 of the mold 101. In this Example, the shaping of the molded article was carried out simultaneously with the infiltration of the fluorocompound in the surface of the molded article, as described above, Post-step for Surface-Modifying Method In this Example, the molded article having the metal complex and the fluorine-based solution infiltrated therein was subjected to an annealing treatment. Specifically, the molded article was annealed at 150° C. for one hour, using a known heat-treating furnace. The metal complex infiltrated in the molded article was reduced by this heat treatment to function as catalytic nuclei for plating. Again, in this Example, the catalytic nuclei for plating could be collected on the surface portion of the molded article, because the metal complex and the fluorocompound as low molecular weight compounds infiltrated in the molded article tended to easily bleed out due to this heat treatment.

The palladium catalytic nuclei which participated in the plating and which were present in the proximity of the surface of the molded article were likely to cause concentration spots on the interior of the molded article obtained by the same molding shot, and thus, there was a danger to cause non-adhesion of the plated film or lower the adhesion strength of the plated film at the portions where the catalytic nuclei were present at low densities. However, the above-described bleed-out treatment was found to produce the following effects: that is, the palladium catalytic nuclei collected even on the portions with low densities of the catalytic nuclei during the molding operation, so that a concentration of the catalytic nuclei, sufficient to cause a quick plating reaction could be obtained, with the result that the non-adhesion of the plated film could be eliminated, and also that an adhesion strength equivalent to that of a portion where the concentration of the catalytic nuclei was high could be obtained.

Evaluation of External Appearance of Molded Article

Next, the distribution state of the Pb complex infiltrated in the molded article obtained by this injection molding was visually observed. Polyamide 6 (Nylon 6, Novamid GH10, manufactured by Mitsubishi Engineering-Plastics Corporation) used as the resin for molding was usually white in color. In contrast, hexafluoroacetyl-acetonatopalladium (II) as the metal complex infiltrated in the resin is brownish-red in color. The molded article practically obtained in this Example was entirely colored brownish-red, and the color density thereof was confirmed to be substantially uniform.

Accordingly, it was confirmed that, in the molded article shaped by the above-described method, the metal complex was entirely and uniformly infiltrated in the surface of the molded article. As a result of the present inventors' intensive studies, it was confirmed that the color density of the molded article obtained in this Example was sufficient as the concentration of the catalytic nuclei for plating, based on the correlation data among the accumulated variable color densities, the plating reactivity and the adhesion strength. The variations of the color densities and the concentration distributions of a plurality of molded articles obtained by continuous 50 shots of injection molding operations were examined. As a result, it was confirmed that the variations thereof among the molded articles obtained by the 50 shots were very small.

Method for Forming Plated Film

Next, nonelectrolytic plating was made on the plastic molded article (or the molded body) obtained by the above-described process, to thereby form a plated film on the surface of the molded article. Specifically, a solution mixture of a supercritical carbon dioxide and an nonelectrolytic plating solution was used for the nonelectrolytic plating.

Figure 5:
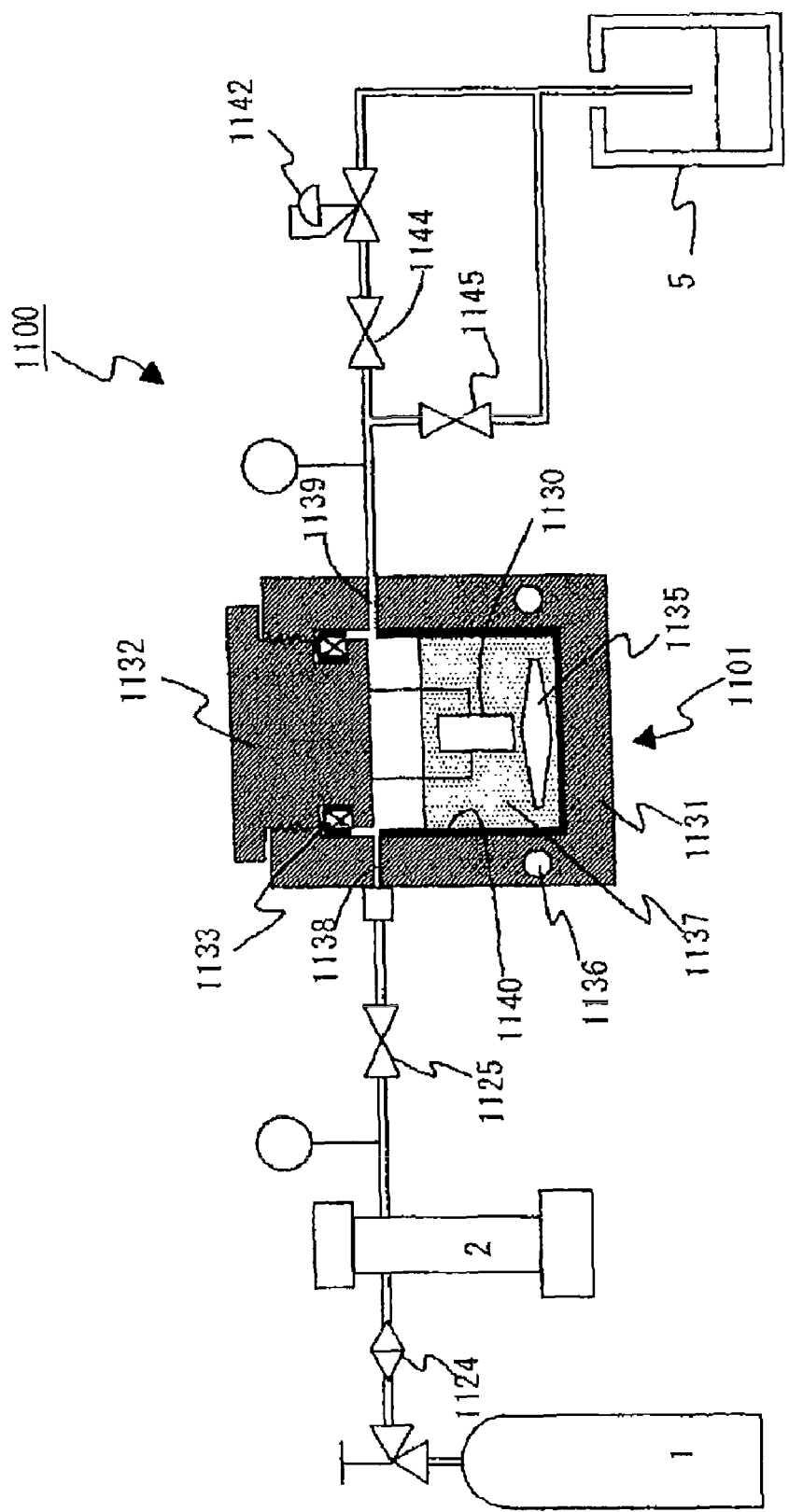
FIG. 5 shows the schematic diagram of the nonelectrolytic plating apparatus used in Example 1, illustrating the structure thereof.

FIG. 5 shows the schematic diagram of the nonelectrolytic plating apparatus for batch process of this Example, using the supercritical carbon dioxide. The apparatus 1100 includes a liquid carbon dioxide bomb 2, a syringe pump 1 and a high-pressure container 1101 as main components.

The high-pressure container 1101 could be controlled to an optional temperature of from 30 to 145° C. with water which passed through the temperature-regulating channel 1136 and which was controlled in temperature by a temperature regulator (not shown). A high-pressure gas was sealed in the high-pressure container 1101 by closing the container body 1131 with the lid 1132 sealed with a polyimide seal 1133 including a known spring therein. Desirably, the high-pressure container 1101 was made of a non-corrodible material such as SUS316, SUS316L, inconel, hastelloy, titanium or the like. In this Example, SUS316L was used.

The molded article surface-modified as described above was suspended from the lid 1132 of the high-pressure container 1101, and the high-pressure container 1101 was filled with an electroless nickel plating solution up to 70% of the inner volume of the high-pressure container 1101, and the magnetic stirrer 1135 was set in the high-pressure container 1101.

The type of the nonolectrolytic plating solution usable in the present invention may be of any of nickel-phosphorus, nickel-boron, palladium, copper, silver, cobalt, etc. In the present Example, a nickel-boron type nonelectrolytic plating solution was used. The infiltration of high-pressure carbon dioxide into the plating solution lowered the pH of the plating solution. Since a preferable plating solution permits plating of a molded article in a neutral or alkalescent to acidic bath, a nickel-phosphorus type plating solution is desirable because it can be used within a range of pH 4 to 6. When the pH of the plating solution lowers, the concentration of phosphorus increases, which results in a lower deposition rate. Therefore, the pH of the plating solution may be previously increased. In this regard, a conventional nonelectrolytic or electrolytic plated film may be laminated on the nonelectrolytic plated film which was formed on the molded article by using a high-pressure carbon dioxide, according to the present invention.

In the nonelectrolytic plating using a high-pressure carbon dioxide, according to the present invention, a plating reaction may be carried out in a nonelectrolytic plating solution which contains alcohol. Alcohols are known to be well compatible with supercritical carbon dioxide under a high pressure, even if they are not stirred. According to the present inventors' studies, addition of an alcohol to a plating solution which contains water as a main component facilitates the stable mixing of the plating solution with a high-pressure carbon dioxide. Therefore, the use of a fluorocompound or the stirring of the mixture becomes unnecessary. The plating solution is infiltrated in a polymer together with a high-pressure carbon dioxide to thereby cause a plating reaction inside the polymer. Therefore, the addition of an alcohol is preferable, since the surface tension of the plating solution lowers, as compared with that of a plating solution containing water alone.

Generally, an nonelectrolytic plating solution is prepared by diluting a stock solution containing metal ions, a reducing agent, etc. with water in a ratio recommended by a manufacturer. In the present invention, an alcohol may be added to water in an optional ratio. While the volume ratio of an alcohol to water may be optionally selected, the volume ratio of the alcohol to the total of water and the alcohol is preferably from 10 to 80%. When the proportion of the alcohol is small, it is difficult to obtain a stable mixture solution. When the proportion of the alcohol is too large, the resultant plating bath tends to be unstable, because an organic solvent such as ethanol is insoluble in nickel sulfate for use in, for example, a nickel-phosphorus plating solution. The kind of an alcohol to be used in the present invention may be optionally selected. In this Example, ethanol was used, while there may be used any of methanol, ethanol, n-propanol, isopropanol, butanol, heptanol, ethylene glycol, etc.

In this Example, as a stock solution which contained a metal salt, i.e., nickel sulfate, a reducing agent and a complexing agent, NICORON DK (150 ml) manufactured by OKUNO CHEMICAL INDUSTRIES CO., LTD, was added to a plating solution (1 L); and water (350 ml) and ethanol (500 ml) as an alcohol were added to the resulting mixture to thereby prepare the plating solution. That is, 50% of the alcohol was contained in the plating solution. It was found that nickel sulfate insoluble in an alcohol could not be used since the addition of 80% or more of the alcohol induced precipitation of a lot of nickel sulfate.

As described above, the molded article sample 1130 and the nonelectrolytic plating solution were charged in the high-pressure container 1101, and then, a high-pressure carbon dioxide was introduced into the high-pressure container 1101 to carry out an nonelectrolytic plating treatment. The high-pressure carbon dioxide from the liquid carbon dioxide bomb 2 was sucked up by the high-pressure syringe pump 1 through the filter 1124 and was raised in pressure to 15 MPa within the pump. After that, the manual valve 1125 was opened to introduce the high-pressure carbon dioxide into the high-pressure container 1101. By controlling the pressure to be constant with the manual valve 1125 opened, the syringe pump 1 used in this Example could absorb fluctuation in pressure even when the inner temperature and the density of the high-pressure carbon dioxide in the high-pressure container 1101 changed. Therefore, the inner pressure of the high-pressure container 1101 could be stably maintained.

In the present invention, a nonelectrolytic plated film was grown on the surface of a polymer molded article as follows: the polymer molded article in which fine metal particles were segregated in the inner portion of the surface was brought into contact with a nonelectrolytic plating solution containing a high-pressure carbon dioxide, at so low a temperature as not to cause a plating reaction; and then, the temperatures of the polymer molded article and of the plating solution containing the high-pressure carbon dioxide were raised to thereby grow a nonelectrolytic plated film on the surface of the polymer molded article. By this procedure of the reaction, the nonelectrolytic plating solution containing the high-pressure carbon dioxide was infiltrated in the inner portion of the polymer molded article before the plating reaction occurred, so that the nonelectrolytic plated film could be grown from the inner portion of the polymer molded article.

Practically, the initial temperatures of the high-pressure container 1101 and of the plating solution 1137 were set at 50° C. lower than the reaction temperature for plating, i.e., 70 to 85° C., by temperature-regulated water which flowed in the temperature-regulating channel 1136. Under such a temperature environment, a high-pressure carbon dioxide to be put in a supercritical state was introduced into the high-pressure container 1101. After that, the magnetic stirrer 1135 was rotated at a high speed. In this initial reaction state, the nonelectrolytic plating solution simply infiltrated the polymer molded article without any growth of a plated film. After that, the temperature of the high-pressure container 1101 was increased to 85° C. so that a plating reaction was caused from the inner portion of the polymer molded article.

After the completion of the above-described nonelectrolytic plating treatment, the magnetic stirrer 1135 was stopped to separate the carbon dioxide from the plating solution. After that, the manual valve 1125 was closed, and simultaneously, the manual valve 1145 was opened to exhaust the carbon dioxide. The polymer molded article was taken out of the high-pressure container 1101. Metallic gross was observed on a whole of the surface of the polymer molded article. Further, a known Cu electrolytic plated film with a thickness of 50 μm was formed on the surface of the resultant molded article under a normal pressure.

Then a heat cycle test was conducted on the molded articles with the plated films formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, the adhesion strength was 19 to 21 N/cm (average 20 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

Example 2

In Example 2, the surface of a molded article was modified in the same manner as in Example 1, except that the molded article was subjected to a vacuuming treatment instead of the annealing treatment, as the post-step for the resin molded article-manufacturing process. After that, a plated film was formed on the resultant molded article.

Post-Step for Surface-Modifying Method

In this Example, the plastic molded article (or molded body) having the metal complex and the fluorine-based solution infiltrated therein was subjected to a vacuuming treatment after the molding process. Specifically, the molded article having the metal complex and the fluorine-based solution infiltrated therein was placed in a vacuum desiccator, and a vacuum pump (or a rotary pump) was used to draw the molded article at a normal temperature under a pressure of $1 \times 10^{-1}$ Pa for 5 hours.

By drawing a vacuum at about 100° C. in this way, the metal complex and the fluorocompound both of which had low molecular weights and which were infiltrated in the molded body were apt to bleed out because of this heat treatment. For this advantage, the metal complex, etc. which functioned as catalytic nuclei for plating could be collected on the surface portion of the molded article.

The palladium catalytic nuclei which participated in plating and which were present in the proximity of the surface of the molded body were likely to cause concentration spots in the molded body obtained by the same molding shot. A plated film was not adhered on parts of the molded article where the concentrations of the catalytic nuclei were lower; or the adhesion strength of the plated film tended to be lower at such parts of the molded article. However, the above-described bleed-out treatment facilitated the bleeding of the palladium catalytic nuclei even at parts of the molded article where the concentrations of the catalytic nuclei were lower during the molding process; thus, the parts of the molded article, having lower concentrations of the catalytic nuclei, were eliminated. Consequently, the entire surface of the molded article could have so high a concentration of the catalytic nuclei as to be sufficient to allow a plating reaction to rapidly proceed thereover; non-adhesion of the plated film could be eliminated; and the parts of the molded article, having a lower concentration of the catalytic nuclei, could obtain an adhesion strength equal to that of the parts thereof having a high concentration of the catalytic nuclei.

Evaluation of External Appearance of Molded Article

Next, the distributed condition of the Pd complex infiltrated in the molded article obtained by this injection molding was visually observed in the same manner as in Example 1. The molded article obtained in this Example was entirely colored brownish-red attributed to the metal complex, and this color was confirmed to have a sufficient density as the concentration of the metal complex. When molded articles were manufactured by continuous 50 shots of injection molding, it was confirmed that variation in the densities of the colors of the molded articles obtained from these shots was very small.

A nonelectrolytic plating treatment using a high-pressure carbon dioxide and a known Cu electrolytic plating treatment were conducted on the molded articles in the same manner as in Example 1. Also, a heat cycle test was conducted on the molded articles while the temperature being switched between −40° C. and 85° C. As a result, there was no molded article from which the plated film was peeled off or which swelled. The adhesion strength of the plated film on the flat portion of the molded article was measured by a vertical tensile test (JISH 8630). As a result, it was 19 to 21 N/cm (average 20 N/cm). Thus, it was confirmed that a target value for this test, i.e., 10 N/cm (an index for a conventional ABS/etching plating) was sufficiently achieved. The plating method of the present invention was therefore confirmed to be effective to reliably form a plated film with high adhesion.

Example 3

In Example 3, the surface of a molded article was modified as follows. A plastic molded article (or molded body) was manufactured by injection molding in the same manner as in Example 1, and simultaneously, a mixture solution of a metal complex and a fluorocompound was infiltrated in the molded article, using a high-pressure carbon dioxide. After that, the fluorocompound in the molded article was bled out and collected in the proximity of the surface of the molded article to thereby modify the surface of the molded article. A plated film (i.e., a metal film) was formed on the modified surface of the molded article in the same manner as in Example 1. In this regard, in Example 3, the mixture solution was prepared by dissolving the metal complex in the fluorine-based solution; this mixture solution was compressed with the syringe pump 1 to have a predetermined pressure; and this high-pressure mixture solution was dissolved in a high-pressure carbon dioxide to form a high-pressure fluid.

Molding Apparatus

Figure 6:
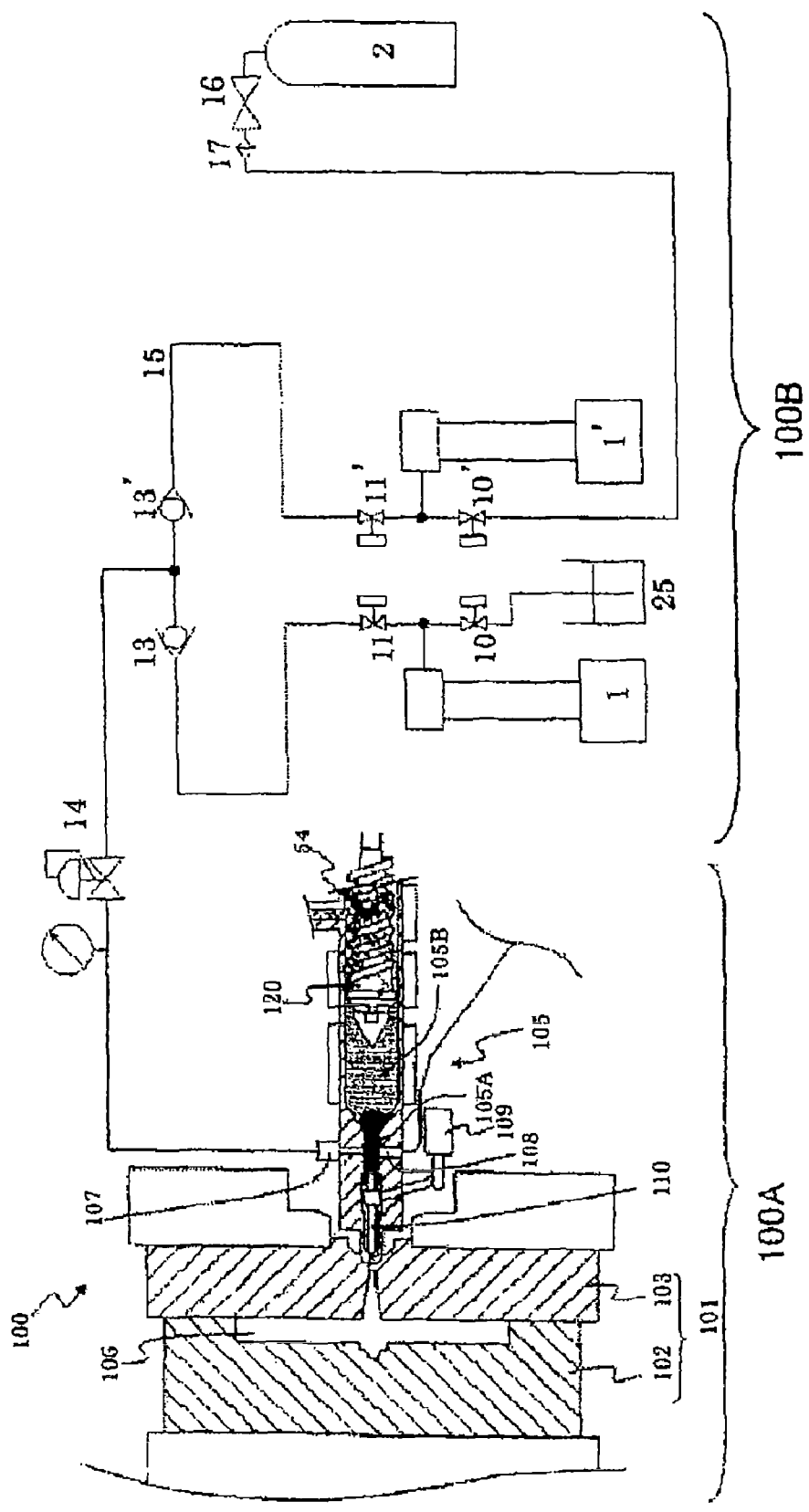
FIG. 6 shows the schematic diagram of the flow front injection-molding apparatus used in Example 3, illustrating the structure thereof.

The schematic structure of the flow front injection-molding apparatus used in this Example is shown in FIG. 6. This molding apparatus 100 comprises an injection-molding section 100A and a high-pressure carbon dioxide-generating section 100B, as well as the molding apparatus shown in FIG. 3 which was used in Example 1. The structure of the injection-molding section 100A is the same as that used in Example 1.

The basic structure of the high-pressure carbon dioxide-generating section 100B is the same as that used in Example 1. However, the liquid carbon dioxide bomb 2 is directly connected to the side of the syringe pump 1' alone, and no dissolution tank 12 is not provided on the side of the syringe pump 1, while the dissolution tank 12 is provided in Example 1, and a material-stocking container 25 is connected to the syringe pump 1 instead, differently from the high-pressure carbon dioxide-generating section 100B shown in FIG. 3.

Perfluorotripentylamine having hexafluoroacetyl-acetonatopalladium (II) dissolved therein was charged in the material-stocking container 25. A pipe connected to the syringe pump 1 was connected to the material-stocking container 25. The syringe pump 1 sucked the fluorine-based solution having the metal complex dissolved therein and directly fed a given required amount of the same solution. On the other hand, the syringe pump 1' supplied a high-pressure carbon dioxide which did not contain any of these materials.

The mixture solution of the metal complex with the fluorine-based solution and the high-pressure carbon dioxide, fed from two directions, were allowed to pass through the check valves 13 and 13', respectively, and were then merged and mixed with each other. Thus, the metal complex and the fluorine-based solution were dissolved in the high-pressure carbon dioxide to form a high-pressure fluid. In this regard, by controlling this mixing ratio for the high-pressure fluid, it was possible to saturate or unsaturate the metal complex and the fluorine-based solution in this high-pressure fluid. It was also possible to prepare the high-pressure fluid in an optional diluting ratio. Then, by feeding required amounts of the metal complex and the fluorine-based solution, it was possible to reliably control the amounts of the metal complex and the fluorine-based solution to be infiltrated in the molded article during the injection-molding, independently of the amount of the high-pressure carbon dioxide to be infiltrated in the molded article. It was also possible to decrease the variation in the infiltrated amounts among each of the shots.

Injection-Molding Method

The molding method in this Example was the same as that in Example 1. In this Example, the flow amounts of the syringe pumps 1 and 1' were controlled so that the supply amounts of the metal complex, the fluorine-based solution and the high-pressure carbon dioxide could be equal to the material supply amounts in Example 1 (the diluting ratio of the materials to the high-pressure carbon dioxide: 1/10). That is, the supply amount of the high-pressure carbon dioxide per one shot was 0.5 ml as in Example 2. The solubility of the fluorine-based solution in the high-pressure carbon dioxide was 100 ml/L (the specific gravity of the fluorine-based solution: 2); and 0.005 ml of the fluorine-based solution was dissolved in 0.05 ml of the high-pressure carbon dioxide so as to adjust the diluting ratio of the materials to the high-pressure carbon dioxide to 1/10. Therefore, the supply amount of the metal complex and the fluorine-based solution per one shot was 5 μl.

Post-Step for Surface-Modifying Method

In the post-step in this Example, the molded article was subjected to an annealing treatment at 150° C. for one hour in a known heat-treating furnace, in the same manner as in Example 1.

Evaluation of External Appearance of Molded Article

Next, the distributed condition of the Pd complex infiltrated in the molded article obtained by this injection molding was visually observed in the same manner as in Example 1. The molded article obtained in this Example was entirely and uniformly colored brownish-red attributed to the metal complex, and this color was confirmed to have a sufficient density as the concentration of the metal complex. A plurality of molded articles were manufactured by continuous 50 shots of injection molding, and variation in the densities of the colors and the concentration distributions of the molded articles was examined. As a result, the variation thereof was confirmed to be very small among the molded articles obtained by the respective shots.

Method for Forming Plated Film

A plated film was formed on the molded article in the same manner as in Example 1. As a result, metallic gloss was observed on the entire surface of the polymer molded article. Further, a known Cu electrolytic plated film with a thickness of 50 μm was formed on the surface of the resultant molded article under a normal pressure.

Then a heat cycle test was conducted on the molded articles with the plated films formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, it was 19 to 21 N/cm (average 20 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

Example 4

In Example 4, the surface of a molded article was modified as follows. A plastic molded article (or molded body) was manufactured by injection molding in the same manner as in Example 1, and simultaneously, a mixture solution of a metal complex and a fluorocompound was infiltrated in the molded article, using a high-pressure carbon dioxide. After that, the fluorocompound in the molded article was bled out and collected in the proximity of the surface of the molded article to thereby modify the surface of the molded article. A plated film (i.e., a metal film) was formed on the modified surface of the molded article in the same manner as in Example 1. In this regard, in Example 4, the metal complex and the fluorine-based solution were dissolved in separate high-pressure carbon dioxides, respectively, and both of the resulting solutions were mixed to form a high-pressure fluid.

Molding Apparatus

Figure 7:
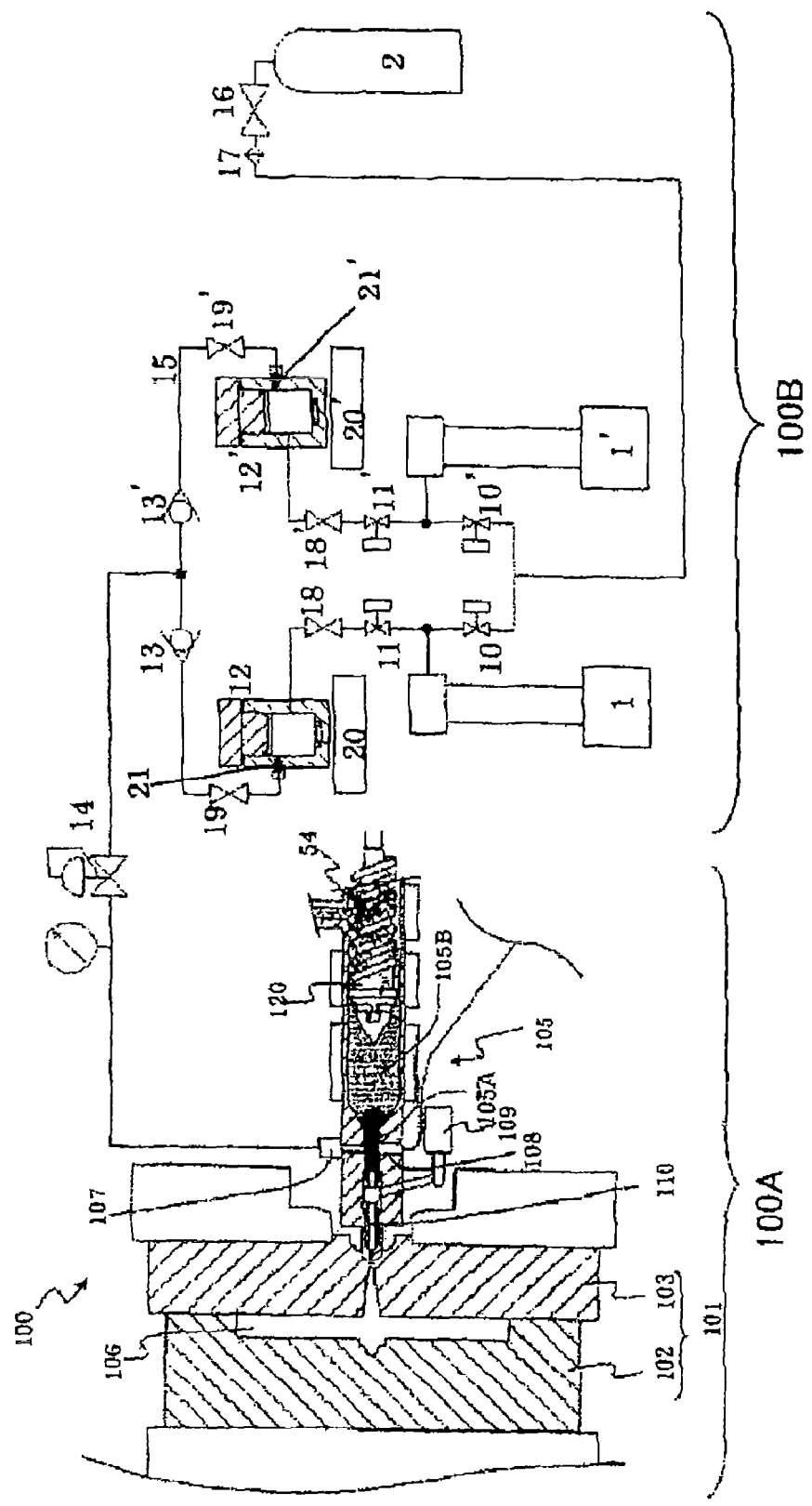
FIG. 7 shows the schematic diagram of the flow front injection-molding apparatus used in Example 4, illustrating the structure thereof

The schematic structure of the flow front injection-molding apparatus used in this Example is shown in FIG. 7. This molding apparatus 100 used in this Example comprises an injection-molding section 100A and a high-pressure carbon dioxide-generating section 100B as well as the molding apparatus shown in FIG. 3. The structure of the injection-molding section 100A is the same as that used in Example 1. The basic structure of the high-pressure carbon dioxide-generating section 100B is the same as that used in Example 1, while a dissolution tank 12' is provided on the side of the syringe pump 1', differently from the structure shown in FIG. 3.

Hexafluoroacetylacetonatopalladium (II) was charged in the dissolution tank 12, and perfluorotripentylamine was charged in the dissolution tank 12'. In this Example, two different materials were dissolved in two separate high-pressure carbon dioxides, respectively. Therefore, by controlling the supply ratio of the metal complex and the fluorine-based solution, the amount of the high-pressure carbon dioxide and the amount of the metal complex in the high-pressure fluid obtained after the mixing can be controlled independently of each other, as well as the case where the materials are diluted with a high-pressure carbon dioxide containing no material.

Injection-Molding Method

The molding method in this Example was the same as that in Example 1. In this Example, the ratio of the flow amount of the high-pressure carbon dioxide having the metal complex dissolved therein to the flow amount of the high-pressure carbon dioxide having the fluorine-based solution dissolved therein was set at 1:9. The supply amount per one shot was 0.5 ml, as well as Example 1. Accordingly, 0.05 ml of the high-pressure carbon dioxide having the metal complex dissolved therein was supplied, and 0.45 ml of the high-pressure carbon dioxide having the fluorine-based solution dissolved therein was supplied, per one shot.

Post-Step for Surface-Modifying Method

In the post-step in this Example, the molded article was subjected to an annealing treatment at 150° C. for one hour in a known heat-treating furnace, in the same manner as in Example 1.

Evaluation of External Appearance of Molded Article

Next, the distributed condition of the Pd complex infiltrated in the molded article obtained by this injection molding was visually observed in the same manner as in Example 1. While the molded article obtained in this Example was almost entirely colored brownish-red attributed to the metal complex, slight concentration spots in color were confirmed, and thus, light colored parts were observed in the molded article. However, the plated film was not so thin in thickness as to cause non-adhesion of the plated film or as to extremely decrease the adhesion strength of the plated film. Further, a plurality of molded articles obtained by continuous 50 shots of injection-molding were evaluated in the variations of the densities of the colors and the concentration distributions thereof. As a result, there were found two molded articles which were light in coloring as a whole.

Method for Forming Plated Film

A plated film was formed on the molded article in the same manner as in Example 1. As a result, some parts poor in gloss were observed in the resultant plated film, however, the plated film was formed over the entire surface of the molded article. Further, a known Cu electrolytic plated film with a thickness of 50 μm was formed on the surface of the molded article under a normal pressure.

Then, a heat cycle test was conducted on the molded articles with the plated films formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, it was 12 to 18 N/cm (average 15 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

Example 5

In Example 5, the surface of a molded article was modified as follows. A plastic molded article (or molded body) was manufactured by injection molding in the same manner as in Example 1, and simultaneously, a mixture solution of a metal complex and a fluorocompound was infiltrated in the molded article, using a high-pressure carbon dioxide. After that, the fluorocompound in the molded article was bled out and collected in the proximity of the surface of the molded article to thereby modify the surface of the molded article. A plated film (i.e., a metal film) was formed on the modified surface of the molded article in the same manner as in Example 1. In this regard, in Example 5, only one syringe pump 1 was used so as not to supply a high-pressure carbon dioxide containing no material. Thus, the materials, not diluted, were supplied.

Molding Apparatus

In this Example, the flow front injection-molding apparatus shown in FIG. 3 which was used in Example 1 was used as it was. However, in this Example, there were not used the syringe pump 1', the air-operate valves 4' and 5' and the check valve 22'. The only one syringe pump 1 was used to supply the high-pressure carbon dioxide having the materials dissolved therein to the injection-molding section. Perfluorotripentylamine having hexafluoroacetyl-acetonatopalladium (II) dissolved therein was charged in the dissolution tank 6, as well as Example 1.

Injection-Molding Method

The molding method in this Example was the same as that in Example 1. In this Example, the supply amount per one shot was 0.5 ml, as well as Example 1. That is, 0.5 ml of the high-pressure carbon dioxide in which the metal complex and the fluorine-based solution were dissolved at saturation solubility was supplied per one shot.

Post-Step for Surface-Modifying Method

In the post-step in this Example, the molded article was subjected to an annealing treatment at 150° C. for one hour in a known heat-treating furnace, in the same manner as in Example 1.

Evaluation of External Appearance of Molded Article

Next, the distributed condition of the Pd complex infiltrated in the molded article obtained by this injection molding was visually observed in the same manner as in Example 1. While the molded article obtained in this Example was almost entirely colored brownish-red attributed to the metal complex, as well as Example 4, slight concentration spots in color were confirmed, and thus, lightly colored parts were observed in the molded article. However, the plated film was not so thin in thickness as to cause non-adhesion thereof or as to extremely decrease the adhesion strength thereof. Further, a plurality of molded articles obtained by continuous 50 shots of injection-molding were evaluated in variation of the densities of the colors thereof and the concentration distributions thereof. As a result, there were found two molded articles which were light in coloring as a whole. It was considered that the supply amount of the metal complex for use in every shot for injection molding was started to decrease during the continuous shots of injection molding.

Method for Forming Plated Film

A plated film was formed on the molded article in the same manner as in Example 1. As a result, the plated film was formed over the entire surface of the molded article, although some parts poor in gloss were observed in the plated film. Further, a known Cu electrolytic plated film with a thickness of 50 μm was formed on the surface of the molded article under a normal pressure.

Then, a heat cycle test was conducted on the molded article with the plated film formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, it was 14 to 21 N/cm (average 17 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

Comparative Example 1

In Comparative Example 1, a molded article was obtained in the same manner as in Example 1, except that a high-pressure carbon dioxide having the metal complex alone dissolved therein was supplied to the resin, without using the fluorine-based solution. In detail, as the molding apparatus, the flow front injection molding apparatus shown in FIG. 3 which was used in Example 1 was used as it was. However, hexafluoroacetylacetonatopalladium (II) alone was charged in the dissolution tank 6.

Injection-Molding Method

The molding method in this Example was the same as that employed in Example 1. In this Example, the supply amount per one shot of injection molding was 0.5 ml as well as Example 1. The ratio of the flow amount of a high-pressure carbon dioxide having the metal complex dissolved therein, from the syringe pump 1, to the flow amount of a high-pressure carbon dioxide having no material dissolved therein, from the syringe pump 1' was set at 1:9. Thus, 0.05 ml of the carbon dioxide having the metal complex dissolved therein was supplied, and 0.45 ml of the carbon dioxide having no material dissolved therein was supplied, per one shot.

Post-Step for Surface-Modifying Method

In the post-step in this Example, the molded article was subjected to an annealing treatment at 150° C. for one hour in a known heat-treating furnace, in the same manner as in Example 1.

Evaluation of External Appearance of Molded Article

Next, the distributed state of the Pd complex infiltrated in the molded article obtained by this injection molding was visually observed in the same manner as in Example 1. The coloring of brownish-red attributed to the metal complex was observed on the substantially entire surface of the molded article, as well as Example 1. However, slight color density spots on the molded article were observed, and thus, parts light in coloring were observed on the molded article. In addition, the brownish-red attributed to the metal complex, on the parts of the molded article where the coloring was light, was too light to be visually observed. Accordingly, there was confirmed possible non-adhesion of the plated film or possible extremely weak adhesion strength of the plated film. Further, variations in the color densities and concentration distributions of a plurality of molded articles obtained by continuous 50 shots of injection molding were evaluated. As a result, the coloring of these molded articles was far lighter than that of the molded article of Example 5, and there were found seven molded articles which were likely to cause non-adhesion of plated films. It was considered that the supply amount of the metal complex per every shot became insufficient during the continuous shots of injection molding.

Method for Forming Plated Film

A plated film was formed on the molded article in the same manner as in Example 1. As a result, some parts of the resultant plated film were poor in gloss and growth, however, the plated film was formed over the entire surface of the molded article. Further, a known Cu electrolytic plated film with a thickness of 50 μm was formed on the surface of the molded article under a normal pressure.

Then, a heat cycle test was conducted on the molded articles with the plated films formed thereon, while the temperature being switched between −40° C. and 85° C. As a result, 50% of all the molded articles as samples subjected to the heat cycle test were found to have blisters with diameters of about 1 mm. The adhesion strength of the plated film on the flat portion of the molded article was measured by a vertical tensile test (JISH 8630). As a result, it was 10 to 15 N/cm (average 12 N/cm). Thus, it was confirmed that, while this value was not smaller than a target value for this test, i.e., 10 N/cm, which was an index for a conventional ABS/etching plating, sufficient improvement of the adhesion strength was not achieved. The plating method of this Comparative Example was therefore confirmed to be insufficient to reliably form a plated film with high adhesion.

Example 6

In Example 6, a plated film was formed after the surface of a molded article was modified in the same manner as in Example 1, except that, as the fluorine-based solution, there was used perfluoro-2,5,8,11,14-pentamethyl-3,6,9,12,15-pentaoxaoctadecanoyl fluoride of the molecular formula: $C_{18}F_{36}O_6$ (molecular weight: 996.2; and boiling point: 235° C., manufactured by Sinquest Laboratory). In this regard, the metal complex, i.e., hexafluoroacetylacetonatopalladium (II) had high solubility in perfluoro-2,5,8,11,14-pentamethyl-3,6,9,12,15-pentaoxaoctadecanoyl fluoride.

Evaluation of External Appearance of Molded Article

Next, the distributed state of the Pd complex infiltrated in the molded article obtained by this injection molding was visually observed in the same manner as in Example 1. The coloring attributed to the metal complex was observed on the substantially entire surface of the molded article obtained in this Example. However, slight color density spots were observed on the molded article, and thus, parts light in coloring were observed in the molded article. However, non-adhesion of the plated film was not observed in even the parts of the plated film, light in coloring, and the plated film was not so thin as to be extremely weak in adhesion strength. Further, variations in the color densities and concentration distributions of a plurality of molded articles obtained by continuous 50 shots of injection molding were evaluated. As a result, there were found three molded articles which were light in coloring as a whole. It was considered that the supply amount of the metal complex per every shot was started to decrease during the continuous shots of injection molding.

Method for Forming Plated Film

A plated film was formed on the molded article in the same manner as in Example 1. As a result, the plated film was formed over the entire surface of the molded article, although some parts of the plated film were slightly poor in gloss. Further, a known Cu electrolytic plated film with a thickness of 50 μm was formed on the surface of the molded article under a normal pressure.

Then, a heat cycle test was conducted on the molded articles with the plated films formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, it was 16 to 18 N/cm (average 17 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

Example 7

In Example 7, a plated film was formed in the same manner as in Example 1, except that, as the fluorine-based solution, there was used perfluoro-2,5,8,11,14-pentamethyl-3,6,9,12,15-pentaoxaoctadecanoyl fluoride of the molecular formula: $C_{18}F_{36}O_6$ (molecular weight: 996.2; and boiling point: 235° C., manufactured by Sinquest Laboratory), and that, as the metal complex, there was used nickel (II) hexafluoroacetylacetonatohydride. In this regard, nickel (II) hexafluoroacetylacetonatohydride had high solubility in perfluoro-2,5,8,11,14-pentamethyl-3,6,9,12,15-pentaoxaoctadecanoyl fluoride.

Evaluation of External Appearance of Molded Article

Next, the distributed state of the Pd complex infiltrated in the molded article obtained by this injection molding was visually observed in the same manner as in Example 1. The coloring attributed to the metal complex was observed on the substantially entire surface of the molded article. However, slight color density spots were observed on the molded article, and thus, parts light in coloring were observed in the molded article. However, non-adhesion of the plated film was not observed on even the parts of the plated film, light in coloring, and the plated film was not so thin as to be extremely weak in adhesion strength. Further, variations in the color densities and concentration distributions of a plurality of molded articles obtained by continuous 50 shots of injection molding were evaluated. As a result, there were found three molded articles which were light in coloring as a whole. It was considered that the supply amount of the metal complex per every shot was started to decrease during the continuous shots of injection molding.

Method for Forming Plated Film

A plated film was formed on the molded article in the same manner as in Example 1. As a result, the plated film was formed over the entire surface of the molded article, although some parts of the plated film were slightly poor in gloss. Further, a known Cu electrolytic plated film with a thickness of 50 μm was formed on the surface of the molded article under a normal pressure.

Then, a heat cycle test was conducted on the molded articles with the plated films formed thereon, while the temperature being switched between −40° C. and 85° C. As a result, there was no molded article from which the plated film peeled off or which swelled. The adhesion strength of the plated film on the flat portion of the molded article was measured by a vertical tensile test (JISH 8630). As a result, it was 12 to 14 N/cm (average 13 N/cm). Thus, it was confirmed that a target value for this test, i.e., 10 N/cm, which was an index for a conventional ABS/etching plating, was sufficiently achieved. The plating method of the present invention was therefore confirmed to be effective to reliably form a plated film with high adhesion.

TABLE 1

| | Fluorine-based solution | Metal complex | High-pressure CO₃ supply section — Syringe pump 1 | High-pressure CO₃ supply section — Syringe pump 1' | Surface-modifying method |
|---|---|---|---|---|---|
| Ex. 1 | A | C | Metal complex + fluorine solution + CO₃ (Dissolution tank) | CO₂ alone | Heat treatment |
| Ex. 2 | A | C | Metal complex + fluorine solution + CO₂ (Dissolution tank) | CO₂ alone | Vacuuming treatment |
| Ex. 3 | A | C | Metal complex + fluorine solution (Stock container) | CO₂ alone | Hear treatment |
| Ex. 4 | A | C | Fluorine solution + CO₂ | Metal complex + CO₂ | Heat treatment |
| Ex. 5 | A | C | Metal complex + fluorine solution + CO₂ | X | Heat treatment |
| Ex. 6 | B | C | Metal complex + fluorine solution + CO₂ (Dissolution tank) | CO₂ alone | Heat treatment |
| Ex. 7 | B | D | Metal complex + fluorine solution + CO₃ (Dissolution tank) | CO₂ alone | Heat treatment |
| C. Ex. 1 | — | C | Metal complex | CO₂ alone | Heat treatment |

| | Molded article — External appearance — Molded article | Molded article — External appearance — Molded article in each shot | Plated molded article — Adhesion of plated film | Plated molded article — Heat cycle test | Adhesion strength of plated film (N/cm) — Average | Max. | Min. | Max. − min. |
|---|---|---|---|---|---|---|---|---|
| Ex. 1 | ◎ | ◎ | ◎ | ◎ | 20 | 21 | 19 | 2 |
| Ex. 2 | ◎ | ◎ | ◎ | ◎ | 20 | 21 | 19 | 2 |
| Ex. 3 | ◎ | ◎ | ◎ | ◎ | 20 | 22 | 19 | 3 |
| Ex. 4 | ○ | ○ | ○ | ◎ | 15 | 18 | 12 | 6 |
| Ex. 5 | ○ | ○ | ○ | ◎ | 17 | 21 | 14 | 7 |
| Ex. 6 | ○ | ○ | ○ | ◎ | 17 | 18 | 16 | 2 |
| Ex. 7 | ○ | ○ | ○ | ◎ | 13 | 14 | 12 | 2 |
| C. Ex. 1 | Δ | Δ | Δ | ◎ | 12 | 15 | 10 | 5 |

Fluorine-based solution
A: Perfluorotripentylamine
B: Perfluoro-2,5,8,11,14-pentamethyl-3,6,9,12,15-pentaoxa-octadecanoyl fluoride
Metal complex
C: Hexafluoroacetylacetonatopalladium (II)
D: Nickel (II) hexafluoroacetylacetonatohydride The results of the tests conducted after the plating of the molded articles of Examples 1 to 7 and Comparative Example 1 are summarized in Table 1. As shown in Table 1, all the plated films of not only all Examples but also Comparative Example 1 were found to achieve the target adhesion strength. However, the adhesion strength of the plated film of Comparative Example 1 showed large variation, and the average adhesion strength thereof was slightly larger than the target value, i.e., 10 N/cm. In case where molded articles with plated films of this type are commercially manufactured, it can not be expected that the molded articles with the target adhesion strength to plated films can be reliably obtained by a continuous production process. On the other hand, in Examples 1 to 3, the variation in the adhesion strengths of the plated films was extremely small, and the averages of the adhesion strengths thereof were sufficiently larger than the target value, i.e., 10 N/cm. In case where molded articles with plated films of any of theses types are commercially manufactured, molded articles with the target adhesion strengths to plated films can be reliably obtained by a continuous production process.

The following are considered as factors to obtain the particularly superior results in Examples 1 to 3. Firstly, by dissolving the Pd complex in the fluorine-based solution, the same fluorine-based solution functions as a protective agent for the metal complex exposed to a high temperature atmosphere during the injection-molding. As a result, it is considered that the metal complex dissolved in a high-pressure carbon dioxide could be homogeneously dispersed in the resin. Secondly, a high-pressure carbon dioxide having the Pd complex and the fluorine-based solution dissolved and saturated therein is further diluted with another high-pressure carbon dioxide, and therefore, these materials unsaturated therein are supplied and introduced into the resin. Therefore, the metal complex does not abnormally precipitate, even when a pressure loss or a change in temperature occurs in these materials introduced into the plasticizing cylinder 105 (or during the injection molding). As a result, the metal complex dissolved in the high-pressure carbon dioxide can be homogeneously dispersed in the resin. Thirdly, the fluorine-based solution with a low molecular weight, apt to bleed out, is present compatibilizing with the metal complex, and therefore, the metal complex also easily bleeds out together with the fluorine-based solution. Consequently, the Pd catalytic nuclei bleed out from the inner portion of the molded article, up to parts thereof where the densities of the Pd catalytic nuclei are low just after the molding. As a result, it is considered that a density of the Pd catalytic nuclei sufficient for a plating reaction can be easily obtained.

INDUSTRIAL APPLICABILITY

According to the manufacturing process for the resin molded article of the present invention, there is used a fluorine-based solution capable of dissolving a fluorine-containing metal-complex, together with a high-pressure carbon dioxide. Therefore, it becomes possible to select a suitable fluorine-containing metal complex from a wider range of metal complexes, as compared with the conventional process, and it also becomes possible to modify the surfaces of various kinds of molded articles by using this fluorine-containing metal complex. In addition, there is used the fluorine-based solution which is dissolved in the high-pressure carbon dioxide together with the fluorine-containing metal complex before a molding operation, and therefore, the fluorine-based solution is not left to remain after the molding operation. Consequently, any step for removing the fluorine-based solution after the molding operation is not needed, so that a molded article whose surface is not roughened can be obtained. According to the method for forming a metal film in the present invention, a metal film is formed over this surface-modified molded article, and therefore, it is not needed to use a harmful etchant, as is the case with the conventional plating method, and a metal film superior in smoothness and adhesion strength can be formed.

For these advantages, the present invention can be suitably applied to the formation of metal films on lamp reflectors, etc. which require high reflectance, and the shaping of high frequency molded interconnect devices (or MID) which require good electric characteristics, millimeter-wave antennas, printed boards, etc. The present invention also can be applied to a variety of industrial fields and is also suitable as a method for forming a metal film at a lower cost under a clean environment. It is further possible to employ the metal film-forming method of the present invention for a molded article with large dimensions and a complicated shape.

The invention claimed is:

1. A process for producing a resin molded article, comprising the steps of
    forming a high-pressure fluid by dissolving, in a high-pressure carbon dioxide, a fluorine-containing metal complex and a fluorine-based solution capable of dissolving said metal complex,
    introducing said high-pressure fluid into a heated and molten resin, and
    molding the resin into which said high-pressure fluid has been introduced, to shape the resin molded article.

2. The process of claim 1, wherein the dissolution of said fluorine-containing metal complex and said fluorine-based solution in said high-pressure carbon dioxide comprises the steps of
    dissolving said fluorine-containing metal complex in said fluorine-based solution, and
    dissolving, in said high-pressure carbon dioxide, said fluorine-based solution in which said fluorine-containing metal complex is dissolved.

3. The process of claim 2, wherein the dissolution of said fluorine-containing metal complex in said fluorine-based solution comprises the steps of
    dissolving said fluorine-containing metal complex in said fluorine-based solution to form a mixture solution, and
    allowing said mixture solution to have a high pressure.

4. The process of claim 1, wherein the dissolution of said fluorine-containing metal complex and said fluorine-based solution in said high-pressure carbon dioxide comprises the steps of
    dissolving and saturating said fluorine-containing metal complex and said fluorine-based solution in a first high-pressure carbon dioxide, and
    mixing said first high-pressure carbon dioxide in which said fluorine-containing metal complex and said fluorine-based solution are dissolved and saturated, with a second high-pressure carbon dioxide in which any of said fluorine-containing metal complex and said fluorine-based solution is not dissolved.

5. The process of claim 1, using an injection-molding apparatus comprising a mold and a heating cylinder which heats and melts said resin and injects the heated and molten resin into said mold, wherein the introduction of said high-pressure fluid into said heated and molten resin comprises the step of introducing said high-pressure fluid into said resin which is heated and molten in said heating cylinder; and the molding of said resin into which said high-pressure fluid is introduced comprises the step of injecting said resin into which said high-pressure fluid is introduced, into said mold from said heating cylinder.

6. The process of claim 1, further comprising a step of subjecting, to a heat treatment, said molded article shaped of said resin into which said high-pressure fluid is introduced.

7. The process of claim 1, further comprising a step of subjecting, to a vacuuming treatment, said molded article shaped of said resin into which said high-pressure fluid is introduced.

8. The process of claim 1, wherein said fluorine-based solution has a boiling point of from 150 to 400° C.

9. The process of claim 1, wherein the molecular weight of said fluorine-based solution is from 500 to 15,000.

10. The process of claim 1, wherein a high-pressure carbon dioxide having a pressure of from 5 to 25 MPa is used as said high-pressure carbon dioxide in which said fluorine-containing metal complex and said fluorine-based solution are dissolved.

11. The process of claim 1, wherein said metal complex is hexafluoroacetylacetonatopalladium (II) or nickel (II) hexafluoroacetylacetonatohydride, and wherein said fluorine-based solution is perfluorotripentylamine or perfluoro-2,5,8,11,14-pentamethyl-3,6,9,12,15-pentaoxaoctadecanoyl fluoride.

12. The process of claim 1, further comprising a step of forming a metal film on said molded article.

13. The process of claim 12, wherein the formation of said metal film on said molded article comprises a step of bringing said molded article into contact with a fluid in which another high-pressure carbon dioxide is compatiblized with a plating solution.

* * * * *